US009561553B2

(12) United States Patent
Waida, Jr.

(10) Patent No.: US 9,561,553 B2
(45) Date of Patent: Feb. 7, 2017

(54) TRANSPORTABLE HORIZONTAL BANDSAW ASSEMBLY

(71) Applicant: Richard A. Waida, Jr., Columbiana, OH (US)

(72) Inventor: Richard A. Waida, Jr., Columbiana, OH (US)

(*) Notice: Subject to any disclaimer, the term of this patent is extended or adjusted under 35 U.S.C. 154(b) by 43 days.

(21) Appl. No.: 14/674,412

(22) Filed: Mar. 31, 2015

(65) Prior Publication Data

US 2015/0273598 A1 Oct. 1, 2015

Related U.S. Application Data

(60) Provisional application No. 61/973,289, filed on Apr. 1, 2014.

(51) Int. Cl.
*B23D 53/00* (2006.01)
*B23D 53/04* (2006.01)
(Continued)

(52) U.S. Cl.
CPC ............. *B23D 53/001* (2013.01); *B23D 53/04* (2013.01); *B23D 53/08* (2013.01); *B23D 55/02* (2013.01);
(Continued)

(58) Field of Classification Search
CPC ....... B23D 53/001; B23D 53/08; B23D 53/02; B23D 53/04; B23D 55/10; B23D 55/026; B23D 53/06; B23D 53/023; B23D 53/026; B23D 55/02; B23D 53/065; B23D 59/007; B23D 53/10; Y10T 83/7226; Y10T 83/707; Y10T 83/7195; Y10T 83/7239; Y10T 83/7108; Y10T 83/7158; Y10T 83/7164; Y10T 83/717; Y10T 83/7201; Y10T 83/722; B27B 13/02; B27B 13/04; B27B 13/00; B27B 13/06

See application file for complete search history.

(56) References Cited

U.S. PATENT DOCUMENTS

| 223,964 | A | * | 1/1880 | Van Riper | ............... | B23D 53/04 |
| | | | | | | 83/794 |
| 357,679 | A | * | 2/1887 | Maxwell | .................. | B26D 1/52 |
| | | | | | | 83/441.1 |

(Continued)

FOREIGN PATENT DOCUMENTS

| DE | 449890 A | * | 3/1913 | ............. | B27B 13/00 |
| DE | 3334379 A1 | * | 4/1985 | ........... | B23D 53/005 |
| FR | 2551625 A1 | * | 3/1985 | ........... | A01D 87/127 |

OTHER PUBLICATIONS

Kasto Ltd., www.kasto.uk.com/News/saws/1218.htm, "Bandsaw cuts material two metres across", 3 pages, document is undated but printed from the pertinent website on Jun. 30, 2013.

*Primary Examiner* — Jonathan Riley
(74) *Attorney, Agent, or Firm* — Sand & Sebolt

(57) ABSTRACT

A bandsaw assembly for cutting large diameter workpieces such as turbine rotors, heat exchangers or shafts at a plant or factory and a method of using the same is disclosed. The assembly includes a frame; ground-engaging wheels or a track provided on the frame; a plurality of spaced apart towers extending vertically upwardly from the frame; a rotatable drive wheel mounted on each tower, said drive wheel being horizontally oriented and presenting a vertically oriented circumferential surface; a motor operatively engaged with one or more of the drive wheels; and a bandsaw blade passing around the wheels and being in contact with the circumferential surfaces thereof; said blade being selectively driven by the drive wheels. The towers are variable in length to raise or lower the blade. The assembly (Continued)

is reduced in width for transportation or storage and increased in width for operation.

9 Claims, 14 Drawing Sheets

(51) Int. Cl.
    *B23D 55/02*     (2006.01)
    *B23D 55/10*     (2006.01)
    *B23D 53/08*     (2006.01)

(52) U.S. Cl.
    CPC ............... *B23D 55/10* (2013.01); *Y10T 83/04* (2015.04); *Y10T 83/707* (2015.04); *Y10T 83/7195* (2015.04); *Y10T 83/7226* (2015.04)

(56) References Cited

U.S. PATENT DOCUMENTS

| | | | | |
|---|---|---|---|---|
| 451,199 A * | 4/1891 | Kesseler | .................. | B28D 1/08 125/21 |
| 784,184 A * | 3/1905 | Sebrell | .................. | B23D 53/04 144/33 |
| 840,314 A * | 1/1907 | Horning | .................. | B23D 53/04 83/745 |
| 856,826 A * | 6/1907 | WEbb | .................. | B23D 53/04 83/788 |
| 1,303,809 A * | 5/1919 | Lufgren | .................. | B23D 53/12 30/380 |
| 1,617,565 A * | 2/1927 | Bens | .................. | B27B 17/06 30/371 |
| 2,104,258 A * | 1/1938 | Nightingale | ......... | B23D 53/005 83/401 |
| 2,619,994 A * | 12/1952 | Lower | .................. | A01G 23/091 30/379 |
| 3,263,537 A * | 8/1966 | Rehman | .................. | B26D 1/48 83/661 |
| 3,452,629 A * | 7/1969 | Jacobson | ............. | B23D 53/001 83/812 |
| 4,487,097 A * | 12/1984 | Hara | ...................... | B23D 53/04 83/56 |
| 4,559,858 A | 12/1985 | Laskowski et al. | | |
| 5,193,518 A * | 3/1993 | Moller | .................. | B28B 1/088 125/13.03 |
| 5,213,022 A * | 5/1993 | Elgan | ..................... | B23D 53/04 83/797 |
| 5,524,517 A * | 6/1996 | Robinson | ........... | B23D 57/0007 125/16.01 |
| 6,920,871 B2 * | 7/2005 | Bieri | .................. | B23D 57/0053 125/16.01 |
| 7,276,003 B2 * | 10/2007 | Liao | ....................... | B23D 55/06 474/39 |
| 7,406,905 B2 * | 8/2008 | Lawler | ............... | B23D 57/0061 125/21 |
| 7,922,424 B2 * | 4/2011 | Clark, II | ........... | B23D 57/0007 405/156 |
| 8,651,098 B2 * | 2/2014 | Shae | .................. | B23D 57/0007 125/16.02 |
| 8,746,228 B2 * | 6/2014 | Jenkins | ............. | B23D 57/0007 125/12 |
| 2005/0252355 A1* | 11/2005 | Liao | ....................... | B23D 55/10 83/816 |
| 2007/0089576 A1* | 4/2007 | Aihara | .................. | B23D 55/06 83/13 |
| 2007/0267006 A1* | 11/2007 | Ogyu | ...................... | B28D 1/08 125/21 |

* cited by examiner

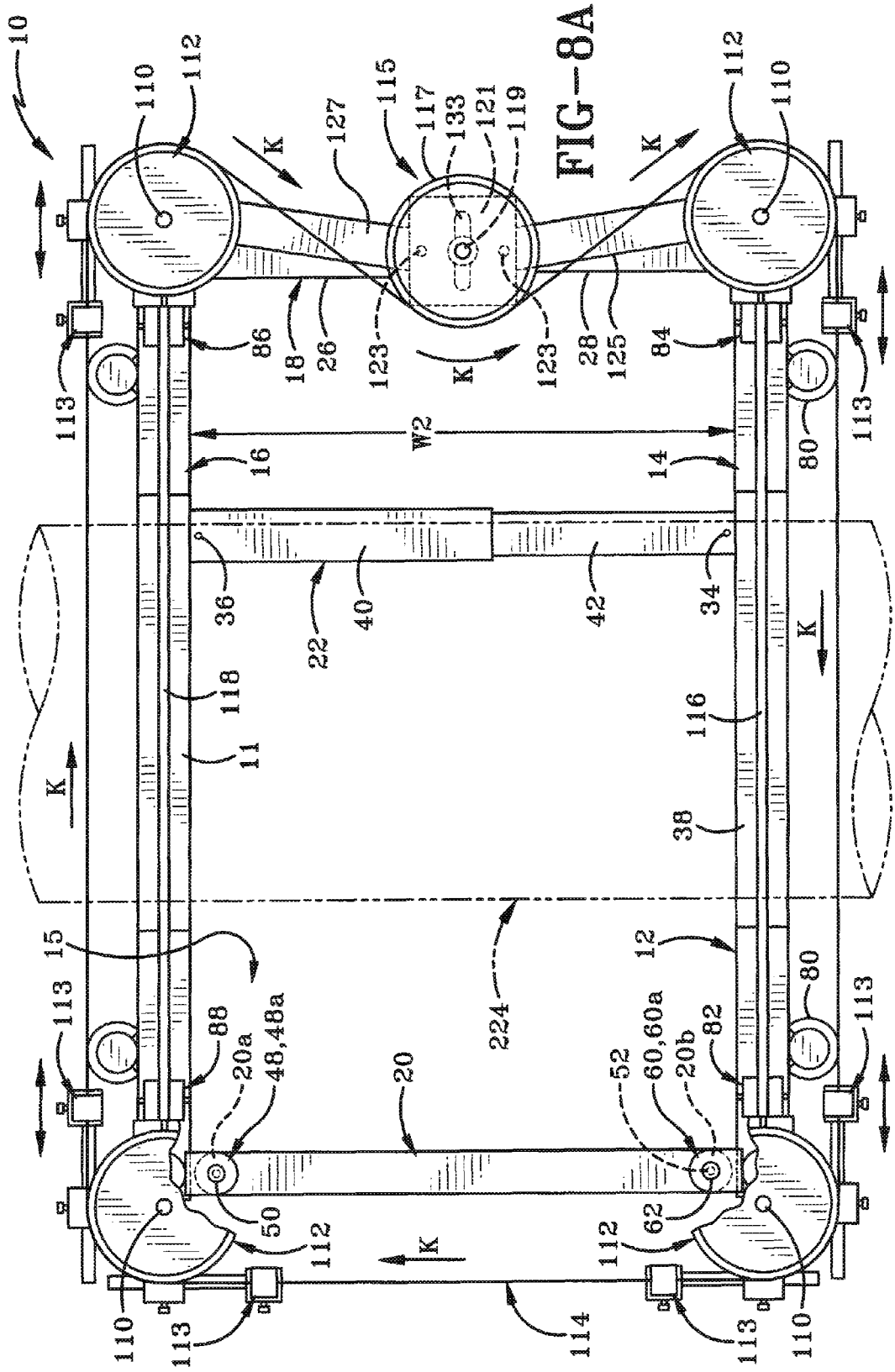

TRANSPORTABLE HORIZONTAL BANDSAW ASSEMBLY

CROSS-REFERENCE TO RELATED APPLICATIONS

This application claims the benefit of U.S. Provisional Patent Application Ser. No. 61/973,289 filed Apr. 1, 2014, the entire specification of which is incorporated herein by reference.

BACKGROUND OF THE INVENTION

Technical Field

This invention relates generally to cutting equipment. More particularly, this invention relates to motorized saws. Specifically, this invention relates to a horizontal bandsaw assembly that is transportable to a jobsite to cut very large diameter cylindrical components in situ. The bandsaw assembly is able to be maneuvered across floor surfaces at the jobsite to position the machine adjacent the workpiece to be cut and the assembly adjustable in height and width to accommodate cylindrical components of different diameters.

Background Information

There is a current worldwide trend of decommissioning older fossil fuel power plants, particularly coal-fired and oil-fired plants, because of environmental concerns. Additionally, many older nuclear power plants are being modernized.

In all of these power plants giant turbines are rotated as part of the electricity generation process. Larger turbine rotors may be in the order of 35 feet long by 14 feet in diameter and may weigh in the region of 180 tons. When power plants are dismantled or when new rotors are to be installed as part of a modernization effort, the old rotors have to be removed. The diameter, size, and weight of these rotors makes it very difficult to accomplish this task. Ideally, the rotor should be cut into smaller sections at the plant to make it easier to remove. However, owner restrictions frequently do not permit workmen to cut the old rotors into smaller sections before removal because this task requires the use of oxygen lancing equipment which may generate toxic smoke and start fires.

It is therefore typical that these large rotors have to be removed in one single piece. Because of the sheer size of the rotor and the need to remove it intact, the removal process takes a long time and is also a very expensive undertaking.

SUMMARY

There is therefore a need for an economically and environmentally improved method of removing large cylindrical components such as turbine rotors, heat exchangers, drive shafts and large diameter pipes from power plant, factories or pipelines. There is further a need for an improved device for cutting large diameter cylindrical components into smaller sections. Still further, there is a need for an improved device for cutting large diameter cylindrical components in situ, i.e., such as at a plant or factory.

A bandsaw assembly for cutting large diameter workpieces such as turbine rotors at a plant or factory and a method of using the same is disclosed.

In one aspect, the invention may provide a bandsaw assembly for cutting larger-diameter cylindrical components into smaller sections, wherein the bandsaw assembly includes a frame; ground-engaging movement members extending downwardly from frame, said movement members being adapted to enable the frame to be moved across a surface upon which the frame rests; mounting members extending upwardly from the frame; a drive assembly engaged with the mounting members; a blade engaged on the drive assembly, said blade having teeth which project downwardly and generally in the direction of the frame; and wherein the drive assembly is operable to rotate the blade.

In another aspect, the invention may provide a bandsaw assembly including a frame; ground-engaging wheels or a track provided on the frame; a plurality of spaced apart towers extending vertically upwardly from the frame; a rotatable drive wheel mounted on each tower, said drive wheel being horizontally oriented and presenting a vertically oriented circumferential surface; a motor operatively engaged with one or more of the drive wheels; and a bandsaw blade passing around the wheels and being in contact with the circumferential surfaces thereof; said blade being selectively driven by the drive wheels. The towers are variable in length to raise or lower the blade. The assembly is reduced in width for transportation or storage and increased in width for operation.

In another aspect, the invention may provide a method of cutting a large-diameter workpiece at a jobsite, said method comprising the steps of:
  a) transporting a bandsaw assembly to the jobsite;
  b) moving the bandsaw assembly across a surface to adjacent the location of the workpiece to be cut utilizing wheels or a track assembly provided on the bandsaw assembly;
  c) positioning the bandsaw assembly so that a first section of the workpiece including a leading edge thereof extends for a distance across a portion of the bandsaw assembly;
  d) raising a series of drive wheels on the bandsaw assembly to position a bandsaw blade engaged around the drive wheels a distance above the workpiece and away from the leading edge thereof;
  e) activating a motor operatively engaged with the drive wheels to rotate the blade;
  f) lowering the drive wheels as the blade rotates;
  g) cutting the first section off the workpiece;
  h) stopping rotation of the blade.

In yet another aspect, the invention may further comprise the steps of:
  i) moving the bandsaw assembly across the surface by way of the wheels or the track assembly so that a second section of the workpiece including a new leading edge thereof extends across the portion of the bandsaw assembly;
  j) repeating steps d) through f)
  k) cutting the second section from the workpiece; and
  l) stopping the rotation of the blade.

The method may further include the steps of:
  m) repeating steps i) through l) until substantially all of the workpiece has been cut into sections;
  n) loading the bandsaw assembly onto a truck or trailer;
  o) driving the truck or trailer away from the jobsite.

In yet another aspect, the invention may further comprise the step of changing a lateral distance between adjacent drive wheels to accommodate workpieces of different widths and/or lowering the drive wheels includes, respectively, extending or retracting a length of a tower upon which each drive wheel is mounted.

In yet another aspect a bandsaw blade mounted on horizontally oriented drive wheels is raised above a workpiece (cylindrical component) by extending towers on which the drive wheels are mounted. Retracting those towers causes the rotating blade to cut into the workpiece. The bandsaw assembly is moved across the floor surface relative to the workpiece to make subsequent cuts.

BRIEF DESCRIPTION OF THE SEVERAL VIEWS OF THE DRAWINGS

A sample embodiment of a band saw assembly in accordance with an aspect of the invention is set forth in the following description, is shown in the drawings and is particularly and distinctly pointed out and set forth in the appended claims.

FIG. 8A is a top view of the bandsaw assembly in the expanded position where the workpiece to be cut is oriented at right angles to the first and second side beams and the assembly is configured for making two simultaneous cuts;

Similar numbers refer to similar parts throughout the drawings.

DETAILED DESCRIPTION

Figure 2:
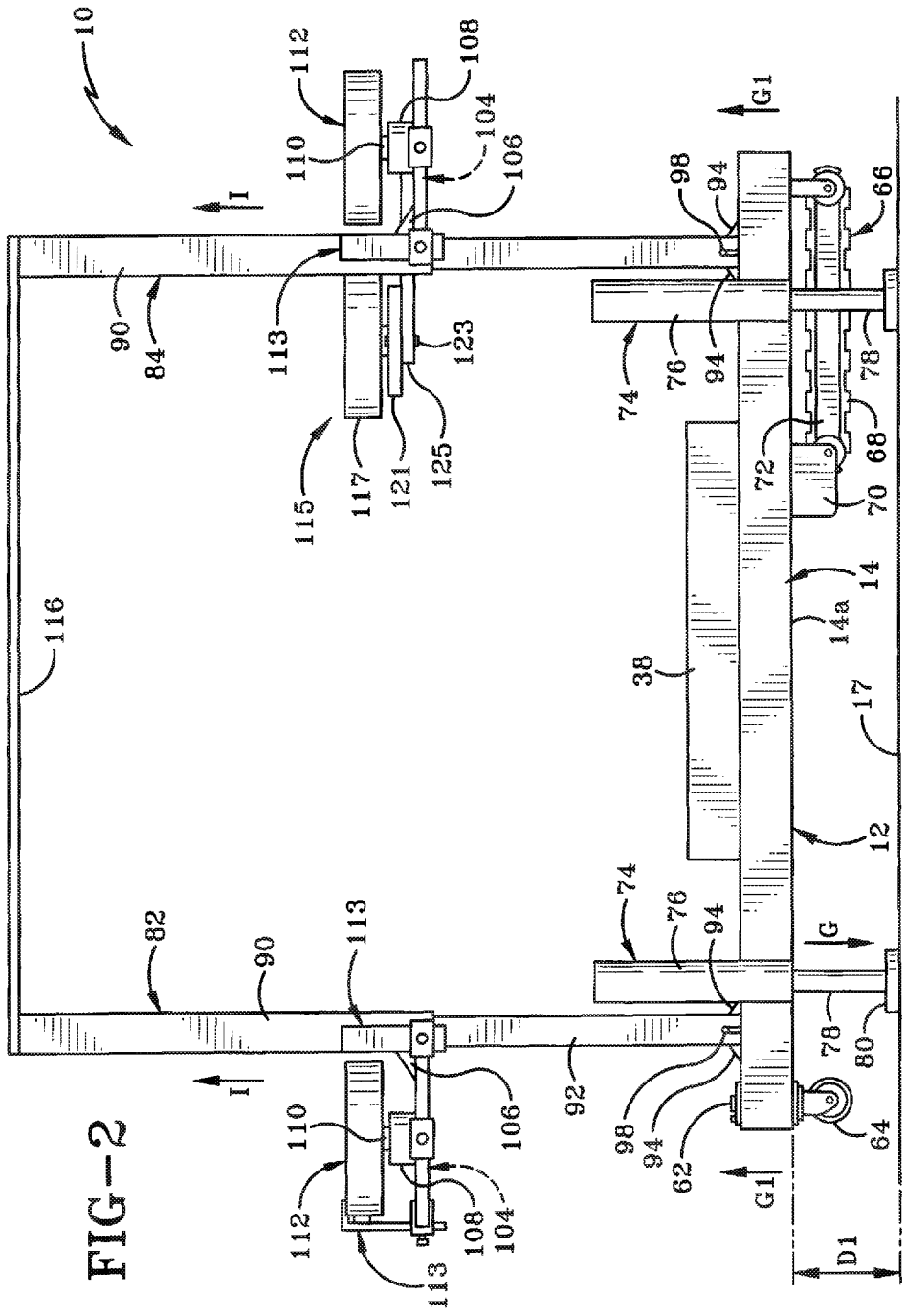
FIG. 2 is a first side view of the bandsaw assembly with the towers and the jacks in an extended position and with the bandsaw blade omitted; a second side view of the bandsaw assembly will be generally a mirror image of the first side view.
Figure 3:
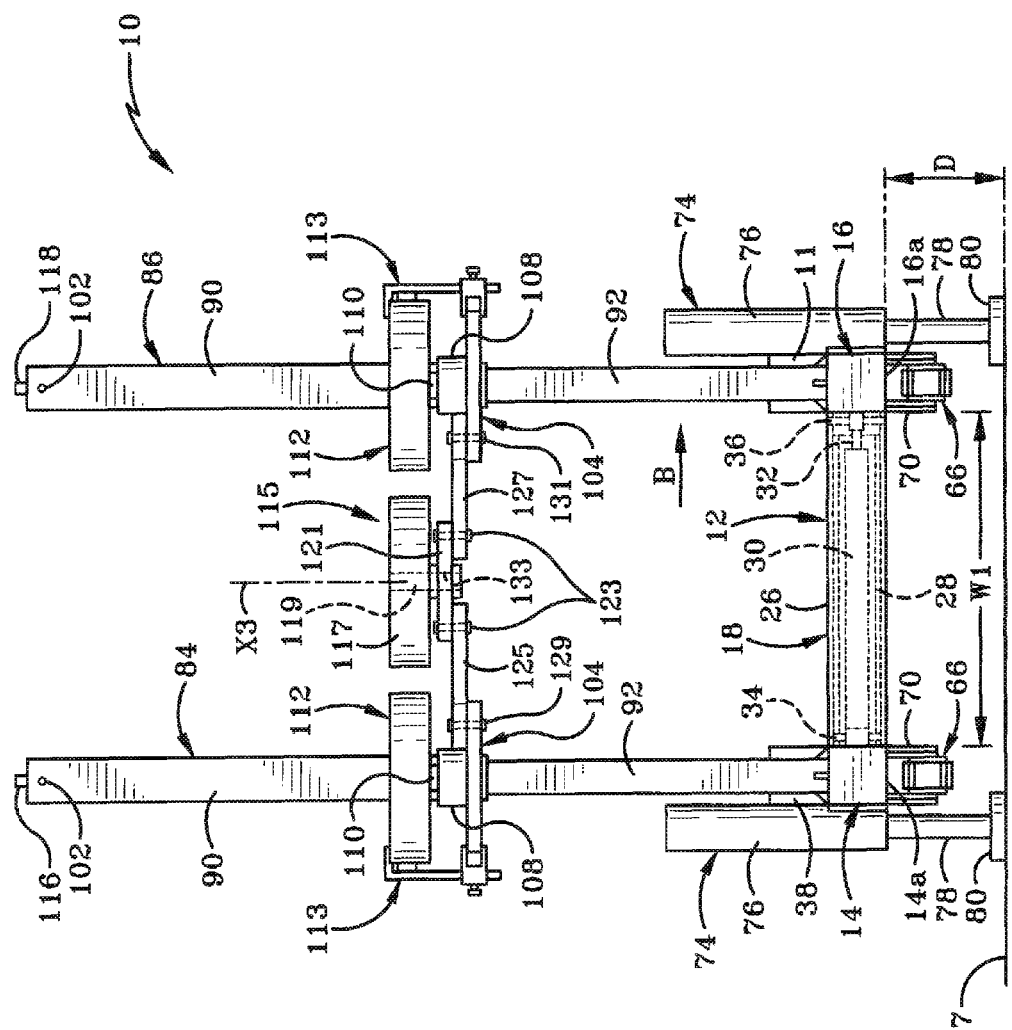
FIG. 3 is a first end view of the bandsaw assembly of FIG. 2.
Figure 4:
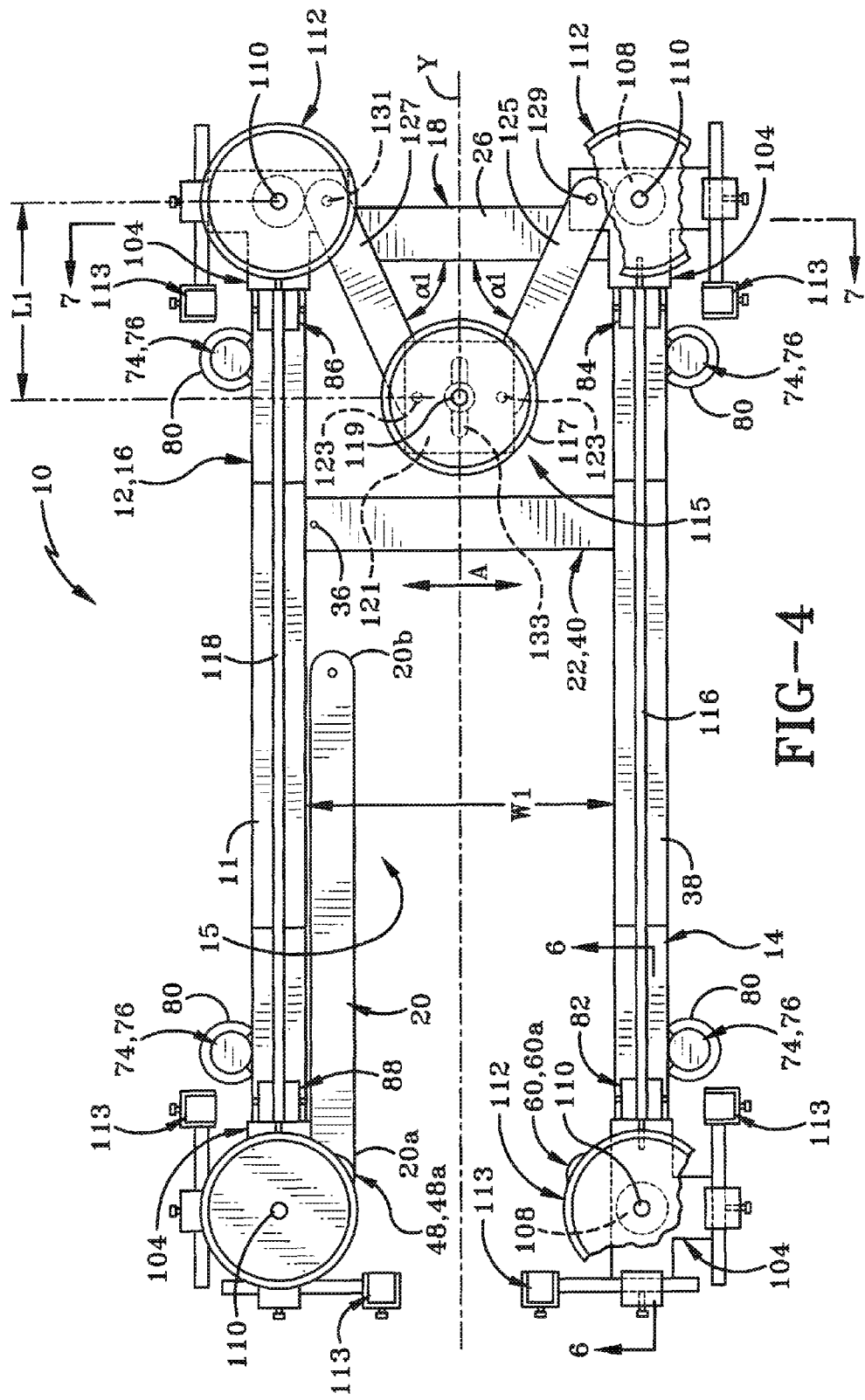
FIG. 4 is a top view of the bandsaw assembly shown in a collapsed position suitable for transporting the assembly, with the first and second beams positioned so that the assembly is set at a minimum width and where an end gate is positioned substantially parallel to first and second beams.

Referring to FIGS. 1-10 there is shown a bandsaw assembly in accordance with an aspect of the present invention, the bandsaw assembly being generally indicate at 10. As best seen in FIG. 4, bandsaw assembly 10 may include a generally rectangular frame 12 having a first side beam 14, a second side beam 16, a first end beam 18 and a second end beam 20. Bandsaw assembly 10 is movable between a first storage or transportation position, shown in FIGS. 1 and 4, and a second operational position, shown in FIGS. 8 and 9.

First and second side beams 14, 16 extend substantially parallel to a longitudinal axis "Y" of frame 12 and are spaced laterally and horizontally a distance apart from each other. Each of first and second side beams 14, 16 may be of any suitable cross-sectional shape such as being generally square in cross-section. Each beam 14, 16 may be about 12 inches in width and about 6 inches in height and from about fifteen feet up to about twenty feet in length. One suitable length for each of the first and second side beams 14, 16 is about sixteen feet.

First end beam 18 extends between first and second side beams 14, 16 at a first end of bandsaw assembly 10 and second end beam 20 is provided at a second end of bandsaw assembly 10. A crossbeam 22 (FIGS. 4 and 8) may extend between first and second side beams 14, 16 to strengthen frame 12 and may be located at any suitable position between first and second end beams 18, 20. Each of the first and second end beams 18, 20 and crossbeam 22 may be square in cross-sectional shape and be around four inches in height and width.

First end beam 18 and crossbeam 22 may extend generally at right angles to first and second side beams 14, 16 and therefore at right angles to longitudinal axis "Y". Second end beam 20 may be pivotable between a first position and a second position depending on whether the bandsaw assembly is in the operational position (FIGS. 8 and 9) or in the transportation/storage position (FIGS. 3 and 4). When bandsaw assembly 10 is in the operational position, second end beam 20 may be in a first position where it extends between first and second side beams 14, 16 and therefore possibly generally parallel to first end beam 18 and crossbeam 22. When bandsaw assembly 10 is to be moved to the transportation/storage position, second end beam 20 may be pivoted to the second position where beam 20 is oriented substantially parallel and adjacent to one or the other of first and second side beams 14, 16.

Figure 1:
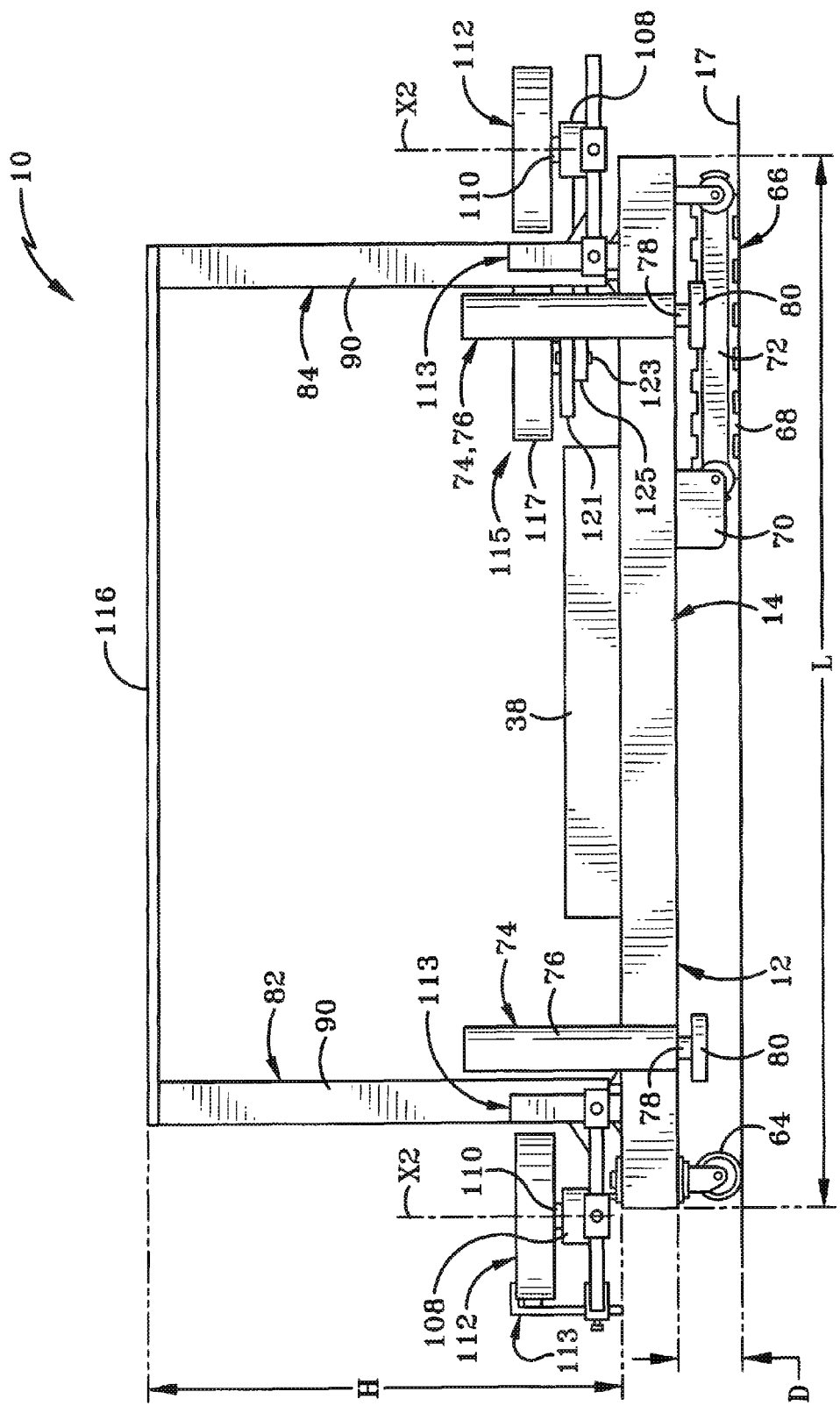
FIG. 1 is a first side view of a bandsaw assembly showing the towers and the jacks thereof in a retracted position and without a bandsaw blade engaged therewith.

The width of frame 12 is the distance measured between first and second side beams 14, 16. When bandsaw assembly 10 is in the transportation/storage position, the width "W1" (FIGS. 3 and 4) may be of a minimum size of about six feet. When bandsaw assembly 10 is in the operational position the width "W2" (FIGS. 8, 8A and 9) may be of a maximum size of about ten feet. When bandsaw assembly 10 is in the operational position, first and second side beams 14, 16 and first and second end beams 18, 20 bound and define a space 15 which is of the width "W2" and a length "L" (FIG. 1). Length "L" is substantially equal to the distance between first and second end beams 18, 20 and may be from about fifteen feet to about twenty feet long.

First and second side beams 14, 16 and first and second end beams 18, 20 may be generally coplanar, although this is not essential for the operation of bandsaw assembly 10. First and second side beams 14, 16 each have a lower surface 14a, 16a (FIGS. 2 and 3) and these surfaces 14a, 16a may also be generally coplanar and spaced a distance "D" (FIG. 1) from a surface 17 upon which bandsaw assembly 10 rests. The surface 17 may be a substantially horizontal concrete floor surface in a factory or plant or may be an uneven surface such as a soil surface beneath a pipeline.

While first and second side beams 14, 16, first and second end beams 18, 20 and crossbeam have been described as being square in cross-section, it will be understood that one or more of these beams may be of a different cross-sectional shape. It will further be understood that crossbeam 22 may be omitted from frame 12 or there may be more than one crossbeam extending between first and second side beams 14, 16. Additionally, one or more of first and second end beams 18, 20 and crossbeam 22 may be oriented at angles other than 90° relative to first and second side beams 14, 16 when bandsaw assembly 10 is in the operational position. It will further be understood that assembly 10 may include additional longitudinally-extending beams or other members that are required to form a structurally sound frame 12. Still further, frame 12 may include panels or other protective structures to shield wiring, hoses or other parts of assembly 10 that may be prone to damage. Wiring, hoses, and other components requiring protection are not illustrated in the attached figures for the sake of clarity.

Bandsaw assembly 10 may be what is known as a "wet saw", meaning that it may include components for cooling down a workpiece 24 (FIG. 8) during a cutting operation. These components may include nozzles, hoses and an associated supply of a cooling liquid, such as water. These components for wetting down the saw are well known in the art and have therefore not been illustrated in the attached figures except for a reservoir 11 which is shown located on second side beam 16 in FIG. 3. (Reservoir 11 may be located at any suitable place on assembly 10.) Reservoir 11 holds a quantity of water or other cooling fluid therein. Appropriate piping will connect reservoir 11 to any spray lines, nozzles or hoses of the cooling system that are positioned to deliver some suitable coolant to the region of a workpiece 24 that is to be cut by bandsaw assembly 10. As indicated above, none of these nozzles or hoses is illustrated in the attached figures.

Figure 7:
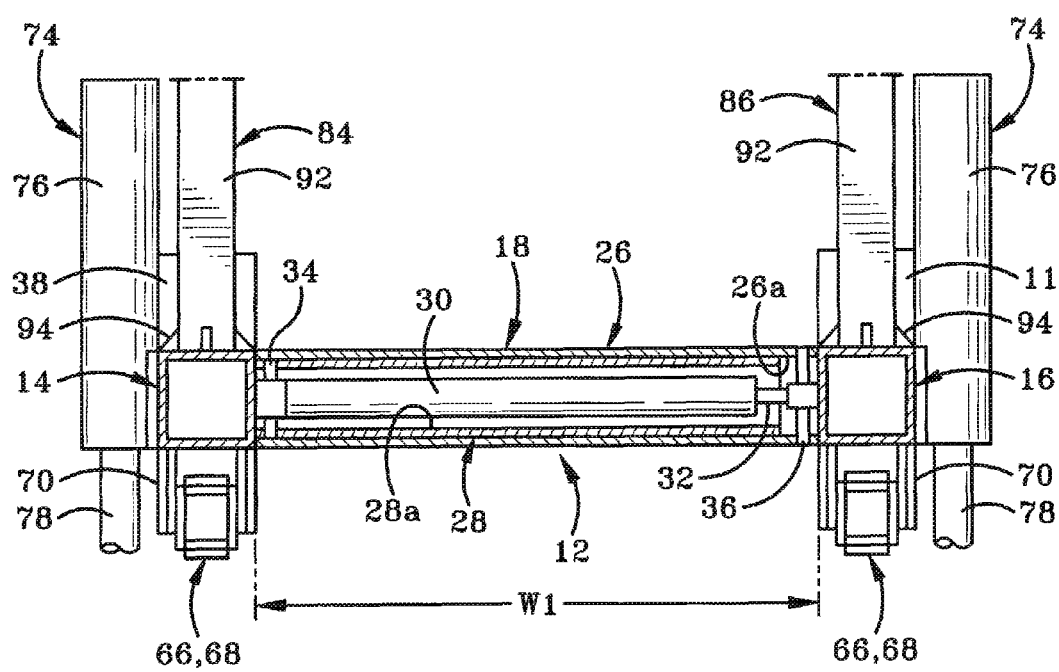
FIG. 7 is a cross-sectional partial first end view taken along line 7-7 of FIG. 4.
Figure 8:
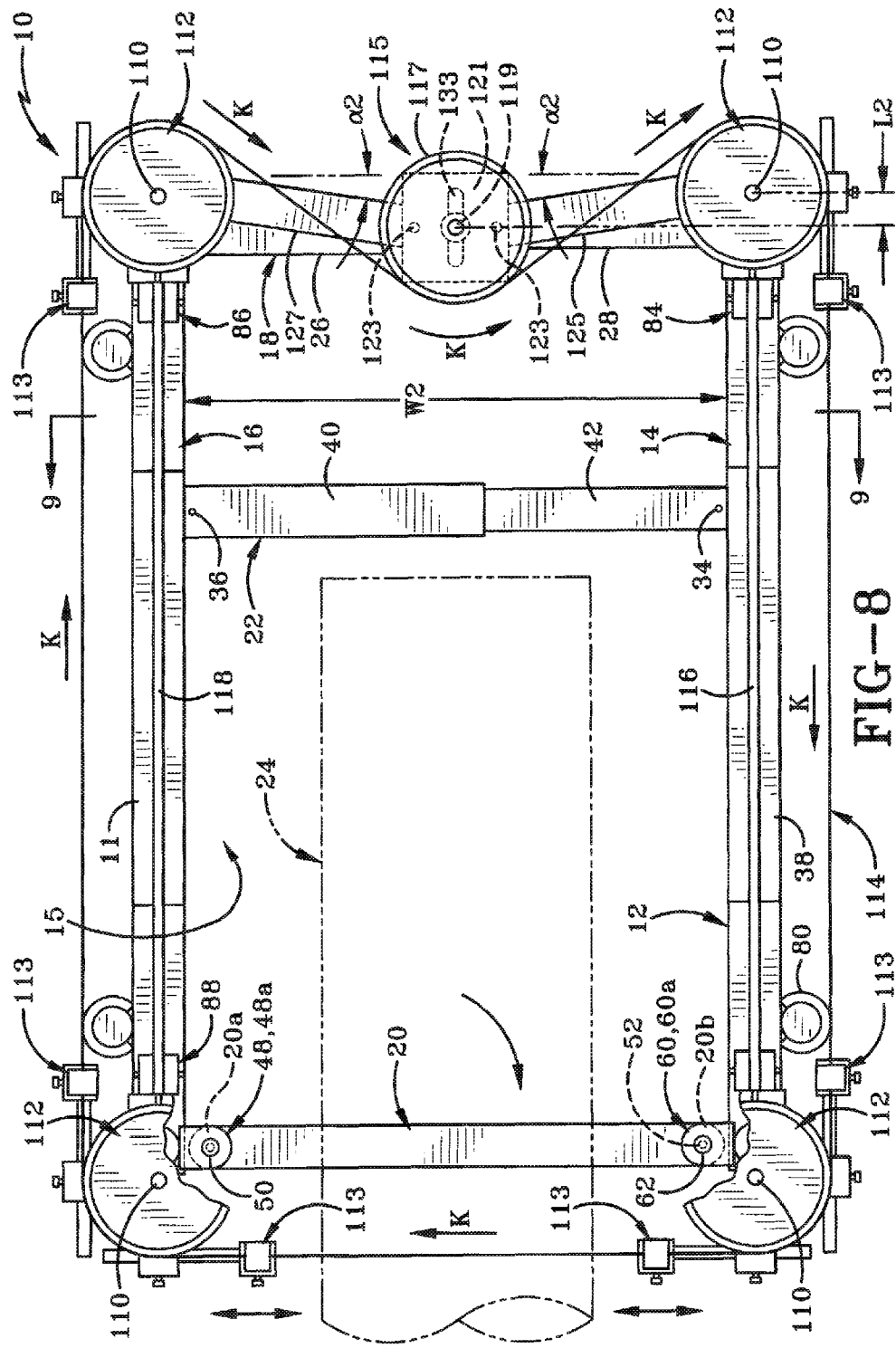
FIG. 8 is a top view of the bandsaw assembly in an expanded position and with two of the drive wheels partially broken away for clarity, with the first and second side beams positioned so that the assembly is set at a maximum width, with the bandsaw blade engaged, and illustrating a workpiece to be cut oriented parallel to the first and second side beams.
Figure 9:
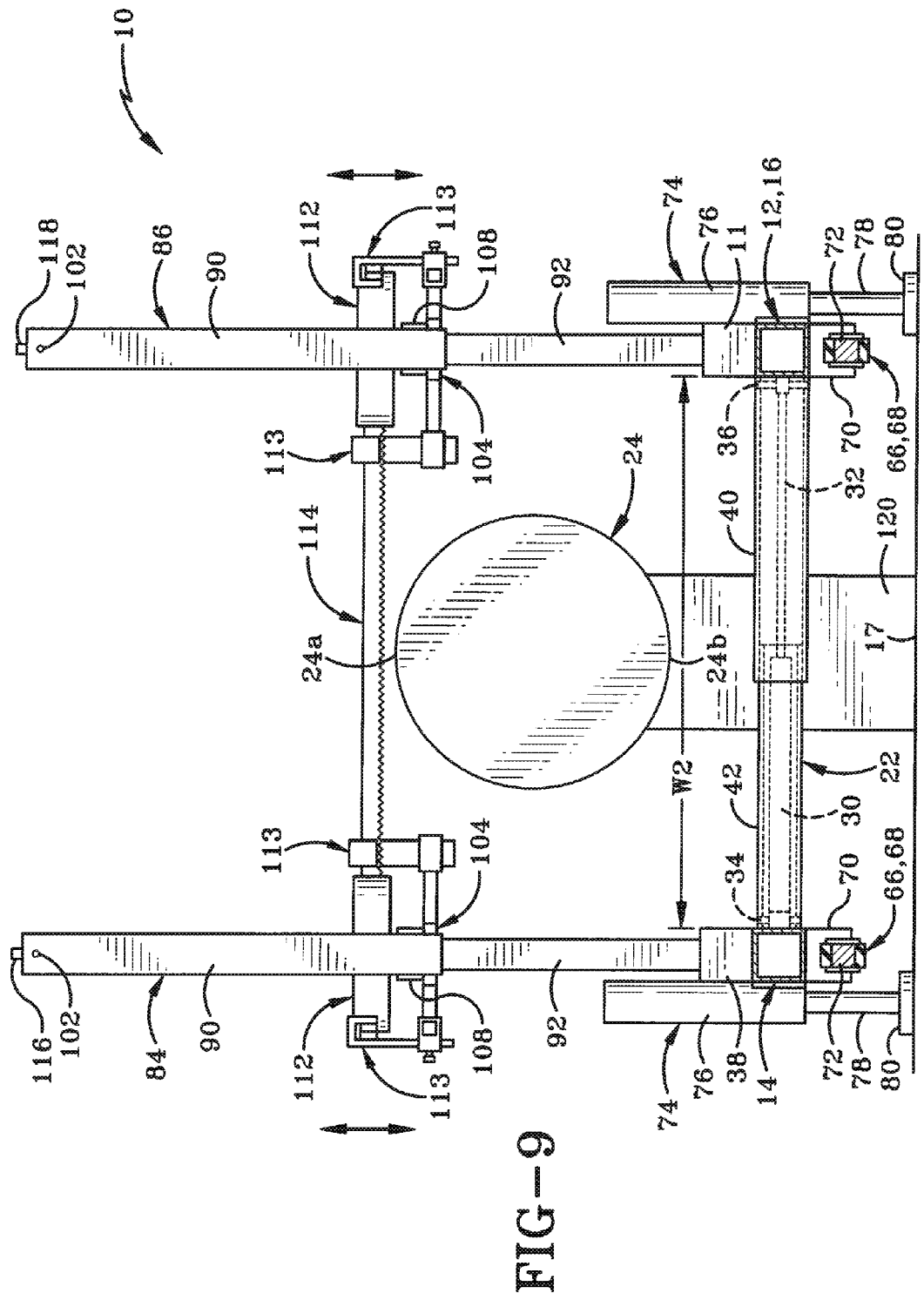
FIG. 9 is a first end view of the bandsaw assembly taken along line 9-9 of FIG. 8 with components of the tensioner assembly omitted for clarity, showing the workpiece being supported and the bandsaw blade positioned to initiate a cut into the workpiece.

First and second side beams 14, 16 are able to be selectively moved laterally toward and away from each other, as is indicated by the arrows "A" in FIG. 4. This movement enables bandsaw assembly 10 to be moved between the storage/transportation width "W1" and the operational width "W2". Since first and second side beams 14, 16 move laterally toward and away from each other to change the overall width of bandsaw assembly 10, each of the first end beam 18 and crossbeam 22 is configured to be adjustable in length so this movement of first and second side beams 14, 16 may occur. The adjustability of first end beam 18 and crossbeam 22 may be accomplished in any one of a number of different ways. A first way is enabled by the configuration of first end beam 18. As best seen in FIGS. 7-9, first end beam 18 comprises a first tubular member 26 and a second tubular member 28. First tubular member 26 may define a bore 26a therein which is of a dimension that enables an end of second tubular member 28 to be received therein. First tubular member 26 is secured to and extends outwardly from second side beam 16. Second tubular member 28 is secured to and extends outwardly from first side beam 14. Although not illustrated herein, it will be understood that some type of stop may be provided on one of both of first and second tubular members 26, 28 to prevent second tubular member 28 from sliding out of bore 26a of first tubular member 26. Second tubular member 28 may also define a bore 28a therein.

An actuating mechanism may be provided to move first and second tubular members 26, 28 relative to each other. The actuating mechanism may be electric screw drive actuators or a hydraulic cylinders or pneumatic cylinders and may be disposed within bores 26a, 28a of first and second tubular member 26, 28. In bandsaw assembly 10, the actuating mechanism is illustrated as being a hydraulic cylinder 30 (FIG. 7) and piston 32. A pin 34 may secure cylinder 30 to second tubular member 28 and a pin 36 may secure piston 32 to first tubular member 26. (It will be understood, that cylinder 30 could instead be provided within bore 26a and be secured to first tubular member 26 and piston 32 could be provided within bore 28a and be secured to second tubular member 28.) The rest of the hydraulic system that is used for operation of cylinder 30/32 is not fully illustrated in the attached figures as such systems are well known in the art and may be configured in a number of ways. A hydraulic reservoir 38 is shown on first side beam 14 as a component representative of the entire hydraulic system. The piping used to connect cylinder 30/32 and hydraulic reservoir 38 has been omitted from the figures for the sake clarity of illustration. Hydraulic reservoir 38 may also be utilized to operate other components of bandsaw assembly 10, as will be described later herein. (Obviously, if the actuating mechanism is pneumatic, then appropriate pneumatic components would be provided on bandsaw assembly 10.)

Hydraulic cylinder 30/32 as part of a larger hydraulic system may be activated via a control system (not shown but located either on frame 12 or as a hand-held remote device). The control system may be provided for setting the parameters (e.g. blade speed) under which bandsaw assembly 10 will operate. The control system may be provided with on/off controls and be operatively connected to the various components of bandsaw assembly 10. It will be understood that the various components of the hydraulic system and the control system may be linked together by appropriate wiring and/or fluid lines but none of these are illustrated herein for the sake of clarity.

When cylinder is activated, piston 32 is caused to extend further outwardly from cylinder 30 in a first direction indicated by arrow "B" (FIG. 3) to increase the width of bandsaw assembly 10; or piston 32 is caused to be retracted further into cylinder 30 in a second direction opposite to arrow "B" to decrease the width of bandsaw assembly 10. Because piston 32 is secured to first tubular member 26, when piston 32 is moved in the direction of arrow "B" or the opposite of arrow "B", first tubular member 26 is caused to move in the same direction. Thus first tubular member 26 is caused to slide in one or the other direction "B" or opposite to "B" relative to second tubular member 28. By virtue of this sliding motion less or more of second tubular member 28 will extend outwardly from the bore 26a of first tubular member 26 and the effective length of first end member 18 is thereby varied. When first and second side beams 14, 16 are closest to each other, only substantially the entire length of first tubular member 26 is visible (see FIGS. 4 and 7). When first and second side beams 14, 16 are at their maximum distance away from each other, substantially the entire length of each of first tubular member 26 and second tubular member 28 are visible (see FIG. 8-10). It will be understood that hydraulic cylinder 30/32 may be activated to position first and second side beams 14, 16 a lateral distance from each other that is one or the other of "W1" and "W2" or any distance in between.

Crossbeam 22 may be similarly configured to first end beam 18 and may include first and second tubular members 40, 42 (FIG. 8) which may be respectively substantially identical to first and second tubular members 26, 28. Crossbeam 22 may include an activation mechanism substantially identical to hydraulic cylinder 30/32.

Figure 5:
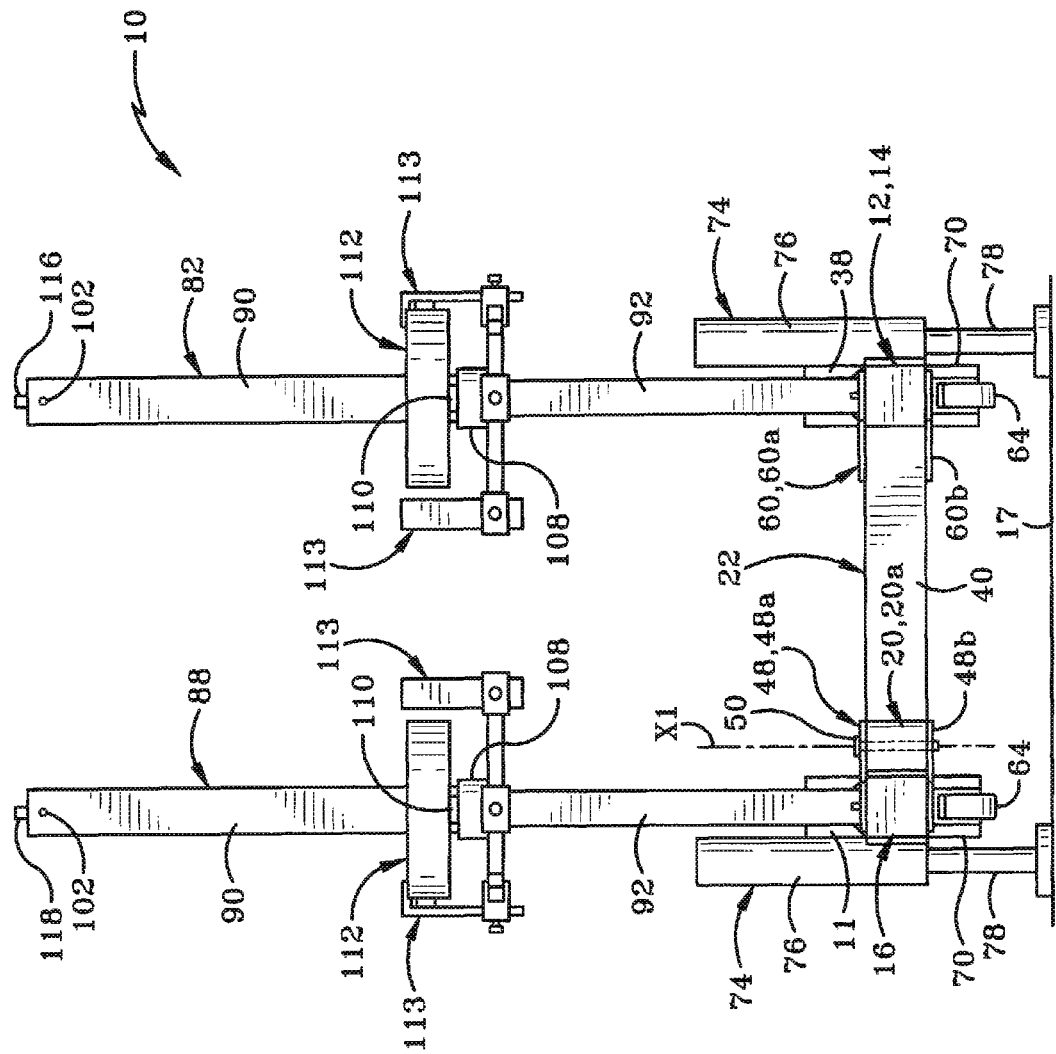
FIG. 5 is a second end view of the bandsaw assembly shown in FIG. 4 with components of the tensioner assembly omitted for clarity.

Second end beam 20 may be a generally tubular member having a first end 20a and a second end 20b. FIGS. 4, 5 and 8 show a mounting bracket 48 securing first end 20a to second side member 16. Mounting bracket 48 includes two spaced apart flanges 48a, 48b separated by a gap of a size sufficient to receive first end 20a of second end beam 20 thereinbetween. A pin 50 passes through aligned holes (not numbered) in flanges 48a, 48b and through a hole defined in a first end 20a. Pin 50 enables second end beam 20 to be pivoted about a vertical axis "X1" (FIG. 5) running along pin 50. Second end 20b defines a vertically oriented hole 52 therein (FIG. 4). Hole 52 is configured to be selectively aligned with a pair of holes (not shown) defined in upper and lower flanges 60a, 60b (FIG. 5) of a mounting bracket 60 provided on first side beam 14. When hole 52 is aligned with the holes in flanges 60a, 60b, a pin 62 (FIG. 8) is passed therethrough to secure second end 20b to bracket 60 and thereby to first side beam 14. When it is desired to open access to space 15, pin 62 is removed from the holes in flanges 60a, 60b and second end beam 20 is pivoted about the axis "X1" to a position where it is positioned adjacent and substantially parallel to second side beam 16.

It will be understood that pin 50 may be removed instead of pin 62. Then second end beam 20 may be pivoted about a vertical axis extending along pin 62 and into a position where second end beam 20 is positioned adjacent and substantially parallel to first side beam 14.

Referring again to FIGS. 1 and 2, frame 12 is provided with ground-engaging movement components that permit the bandsaw assembly 10 to be moved readily easily across the surface 17 upon which bandsaw assembly 10 stands. Any suitable components or combination of components may be provided on frame 12 for this purpose. One possible combination of components for this purpose is illustrated in the figures. A pair of wheels 64 is mounted proximate one end of frame 12 and a track assembly 66 is mounted proximate the other end of frame 12. Track assembly 66 includes a track member 68 that is driven by a motor 70 so that track member 68 will rotate about a central region 72. The drive motor 70 may be electric, hydraulic or pneumatic. Track assembly 66 may be similar to a track assembly that would be provided on a tank, earth-moving equipment, or on multi-terrain vehicles. Additional pair(s) of wheel(s) may be provided on assembly 10. It will be understood that wheels 64 and track assembly 66 may be located in positions other than those illustrated in FIG. 1. Instead of a combination of wheels 64 and a track assembly 66, frame 12 may be provided with only wheels or only a track assembly to move the same across surface 17. Additionally or alternatively, sliders may be provided along with either of the wheels 64 or the track assembly 66 to move bandsaw assembly 10 across the surface 17.

Wheels 64 and track assembly 66 may be mounted at any desired or necessary positions on first and second side members 14, 16 or any other part of frame 12 to provide adequate support and stability during movement of bandsaw assembly across surface 17. Wheels 64 may be capable of swiveling so that bandsaw assembly 10 is more easily moved over surface 17 and around obstructions. If wheels 64 are capable of swiveling then a swivel lock may be provided to ensure that wheels 64 will selectively only be able to move in a straight line.

Frame 12 may also be provided with a plurality of hydraulically, pneumatically or electrically operable levelling jacks 74. If jacks 74 are hydraulic or pneumatic, each jack 74 will include a cylinder 76, a piston 78 and a foot 80 mounted on a free end of piston 78. Jacks 74 are selectively movable between a retracted position (FIG. 1) and an extended position (FIG. 2). When in a retracted position, each foot 80 is positioned adjacent cylinder 76. When in an extended position, each foot 80 is positioned remote from cylinder 76. Jacks 74 may be operatively engaged with the hydraulic or pneumatic system and the control panel which operates some or all of the hydraulic or pneumatic components on bandsaw assembly 10.

Jacks 74 serve a variety of purposes. Firstly, they are provided to aid in the leveling of frame 12 and to orienting frame 12 generally horizontally. This ensures that a blade 114 (FIG. 8) provided on bandsaw assembly 10 will be able to cut at a correct and desired angle relative to a workpiece 24. Additionally, when jacks 74 are actuated to contact surface 17 the wheels 64 and/or track assembly 66 are lifted off surface 17. This ensures that frame 12 will not inadvertently travel across surface 17 during a cutting operation. Additionally, jacks 74 prevent frame 12 from moving across surface 17 during operation of blade 114. Initially, wheels 64 and track 68 of track assembly are in contact with surface 17 and they hold frame 12 a distance "D" off surface 17 (FIG. 1). If blade 114 is operated with wheels 16 and track 68 in contact with surface 17, the motion of blade 114 might inadvertently impart motion to frame 12. This motion might affect the relative positioning of frame 12 and workpiece 24. When a section of workpiece 24 is cut therefrom that cut section might inadvertently strike a portion of frame 12 causing damage to the same and potentially threatening any people in the vicinity of assembly 10. Because wheels 64 and track assembly 66 are no longer in contact with surface 17 frame cannot move easily thereover. Additionally, jacks 74 have a flattened lower surface which is not conducive to moving across surface.

Referring to FIGS. 1 and 2, in order to extend jacks 74 the hydraulic control system on assembly 10 is engaged to extend pistons 78 in the direction of arrow "G" FIG. 2. This motion brings feet 80 into contact with surface 17. The extension motion causes first and second side beams 14, 16, first and second end beams 18, 20 and crossbeam 22 to move upwardly away from surface 17 in the direction of arrow "G1" (FIG. 2). The motion is continued until wheels 64 and track 68 of track assembly 66 are no longer in contact with surface 17 and frame is positioned a distance "D1" from surface 17. ("D1" is greater than "D"). Bandsaw assembly 10 may be operated in this lifted condition because there is then little to no tendency of bandsaw assembly 10 to move across surface 17 during a cutting action.

When it is desired to move bandsaw assembly 10 across surface 17 once again, jacks 74 are retracted, i.e., the hydraulic system is activated to withdraw pistons 78 back into cylinders 76 in the opposite direction to arrow "G" (FIG. 2). This retraction motion is continued until wheels 64 and track 68 are lowered back into contact with surface 17. The retraction motion is continued until feet 80 are lifted a sufficient distance off surface 17 so that they cannot interfere with any subsequent movement of bandsaw assembly across surface 17. It will be understood that jacks 74 may be independently operable to account for differences in the elevation of different regions of surface 17.

Bandsaw assembly 10 may include a plurality of towers 82, 84, 86, 88 (FIG. 4) mounted on frame 12. Towers 82-88 may be configured to extend substantially vertically upwardly from the upper surfaces of first and second side members 14, 16. Bandsaw assembly 10 is disclosed as including four towers 82-88 and each tower is illustrated as being positioned proximate a corner of the rectangular frame 12. It will be understood, however, that more than four such towers could be provided on assembly 10 or fewer than four could be utilized. The towers may also be provided in different locations on frame 12 from those illustrated in the attached figures.

Figure 6:
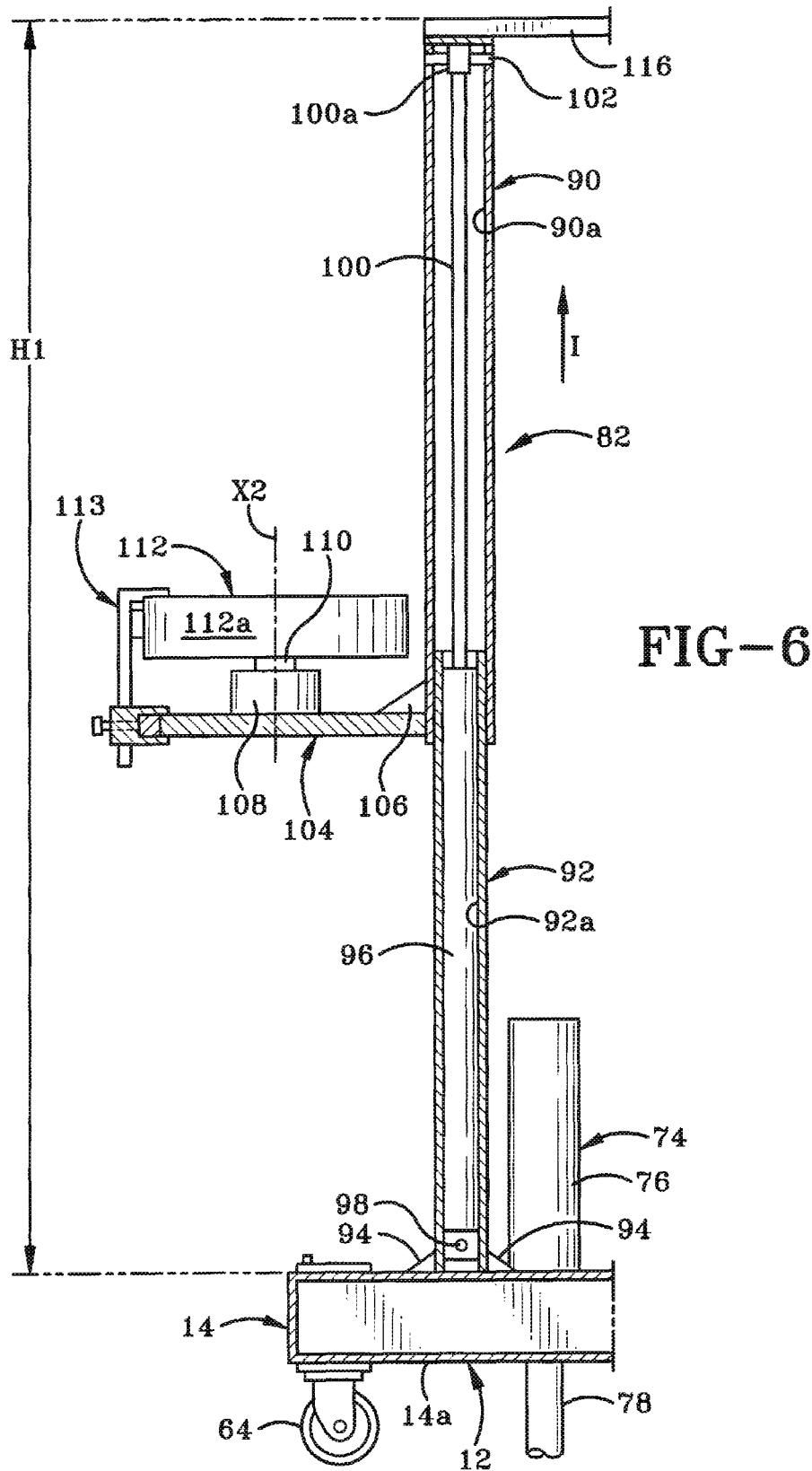
FIG. 6 is a cross-sectional first side view of the second end of the bandsaw assembly taken along line 6-6 of FIG. 4.

Towers 82-88 may be substantially identical to each other and so only one tower, tower 82, will be described in detail herein. Referring to FIG. 6, tower 82 is an elongate member comprising a first tubular member 90 and second tubular member 92 that are designed to telescope relative to each other. First tubular member 90 defines a bore 90a therein and second tubular member 92 is of a cross-sectional shape and size that is complementary to the interior surface of first tubular member 90 which defines bore 90a. Second tubular member 92 is fixedly mounted to first side member 14 in a position adjacent where second end member 20 connects to first side member 14. A mounting bracket 94 with strengthening braces is welded to first side member 14 and second tubular member 92 is secured to this bracket 94 by any suitable means, such as welding or bolting the member 92 thereto.

Tower 82 includes an actuation mechanism for changing the height of the tower. The actuation mechanism causes first tubular member 90 to move relative to the second tubular member 92. When first tubular member 90 is moved upwardly, a section of second tubular member 92 moves out of bore 90a of first tubular member 90 and the effective height of tower 82 is increased. When first tubular member 90 is moved downwardly, a section of second tubular member 92 slides into bore 90a and the effective height of tower 82 is decreased. As indicated earlier herein, the actuation mechanism may be of any suitable type such as an electric ballscrew feed pressure mechanism, a pneumatic cylinder or, as illustrated in the attached figures by way of example only, a hydraulic cylinder 96 and a piston 100. Cylinder 96 may be provided within a bore 92a of second tubular member 92 and is fixed at a first end, via a pin 98, to bracket 94 and to second tubular member 92. Pin 98 is selectively removable so that cylinder 96 may be replaced if necessary. Piston 100 extends outwardly from a second end of cylinder 96. An end 100a of piston 100 is secured by a pin 102 to an upper end of first tubular member 90. Cylinder 96 may be operatively engaged with the hydraulic or pneumatic system (whichever is provided on bandsaw assembly 10) and the control system so that piston 100 may be selectively extended from or retracted into cylinder 96, (As will be understood, the cylinder 96 could alternatively be located within first tubular member 90 and the piston could be located within second tubular member 92.)

When the hydraulic or pneumatic system is activated, then piston 100 is extended outwardly from cylinder 96 in the direction of arrow "T" (FIG. 6). This extension of piston 100 causes first tubular member 90 to be pushed upwardly relative to second tubular member 92 and away from first side member 14, thereby increasing the overall height of tower 82 from a height "H" (FIG. 1) to a height "H1" (FIG. 6). When piston 100 is retracted, first tubular member 90 moves downwardly in the opposite direction of arrow "T" and moves downwardly relative to second tubular member 92 and toward first side member 14. This downward movement may be an active retraction of piston 100 or it may alternatively be the result of electric ballscrew feed pressure, hydraulic pressure or pneumatic pressure in the cylinder being released and the first tubular member 90 returning to the retracted position under action of gravity. All of the towers 82-88 with their associated electric, hydraulic or pneumatic cylinders therein may be actuated simultaneously and to the same extent, although there may be instances where it is desirable to have certain towers 82-88 extend or retract to a different degree relative to other towers, as will be further described herein.

A mounting bracket 104 (FIG. 6) may extend outwardly from a side wall of the first tubular member 90 of tower 82. A brace 106 is provided between first tubular member 90 and mounting bracket 104 to increase the strength of the attachment of bracket 104. A drive motor 108 (and associated gearbox) is mounted on bracket 104. A drive shaft 110 extends outwardly from motor 108 and a drive wheel 112 is provided on drive shaft 110. Wheel 112 is provided to drive bandsaw blade 114 (FIG. 8). Wheel 112 is mounted so as to be rotated by drive shaft 110 about a vertical axis "X2" (FIG. 6). It should be noted that unlike traditional horizontal bandsaws, bandsaw assembly 10 has drive wheels 112 that are horizontally oriented. This means that the surface of each wheel 112 which contacts blade 114 is vertically oriented. Each drive wheel 112 may be independently driven by the associated motors 108. (It will be understood, however, that an alternative arrangement could be utilized where a single motor simultaneously drives all of wheels 112.)

Wheels 112 may have a diameter of about 30 inches, although other diameter wheels may be used, depending on the size of the blade 114 to be driven thereby. Each wheel 112 has a circumferential surface 112a around which a portion of bandsaw blade 114 (not shown in FIG. 6 but shown in FIG. 8) is passed. Surface 112a is oriented so that it is disposed substantially vertically. Blade 114 is therefore oriented so that the teeth thereof face downwardly and generally toward surface 17.

As illustrated, an appropriate adjustable blade guide assembly 113 and shield (as are currently known in the art) may be provided on bandsaw assembly 10 adjacent drive wheel 112 and blade 114. Blade guide assembly 113 may be mounted on mounting bracket 104. Blade guide assembly 113 may be both vertically and horizontally adjustable. Alternatively, instead of blade guide assembly 113 being utilized the surface 112a of wheel may include an annular flange proximate an upper end thereof. This flange may prevent blade 114 from riding upwardly and off wheel 112. Still further, as an alternative to blade guide assembly 113, surface 112a of drive wheel may include an annular groove defined therein to help seat the blade 114 in a correct position on drive wheel 112. Neither of these alternatives is illustrated herein.

A blade tensioning assembly 115 (FIGS. 3, 4, 8 and 8A) may be provided to apply tension to blade 114. Blade tensioning assembly 115 may include a follower wheel 117 mounted via a rod 119 to a mounting plate 121. Mounting plate 121 is connected via pivot pins 123 to a first arm 125 and to a second arm 127. First arm 125 in turn is secured to mounting bracket 104 on tower 84 via a pivot pin 129. Second arm 127 is connected via a pivot pin 131 to mounting bracket 104 on tower 86. FIG. 4 shows that a slot 133 is defined in mounting plate 121. Slot 133 is oriented parallel to longitudinal axis "Y" of frame 12. Rod 119 is inserted through slot 133 in mounting plate 121. Slot 133 allows for adjustment of the position of rod 119 relative to plate 121 so that follower wheel 117 may be correctly oriented relative to drive wheels 112. Wheel 117 is able to be moved longitudinally between the position shown in FIG. 4 and the position shown in FIG. 8. This motion of wheel 117 occurs as first and second side beams 14, 16 are moved relative to each other. First and second arms 125, 127 pivot relative to mounting plate 121 and to the mounting plates 104 when bandsaw assembly 10 is moved between the transportation/storage position and the operation position. The pivoting of first and second arms 125, 127 translates into the longitudinal motion of wheel 117 toward or away from first end beam 118.

Follower wheel 117 is horizontally oriented and is substantially coplanar with drive wheels 112. Follower wheel 117 is configured to rotate about a vertical axis "X3" (FIG. 3) extending along rod 119. Follower wheel 117 is illustrated as a non-driven while, i.e., not driven by a motor. Instead, wheel 117 is rotated movement of blade 114 that is engaged around a portion of the circumferential surface of wheel 117. Although not illustrated herein for the sake of clarity, follower wheel 117 may include blade guides or an annular flange or annular groove to keep blade 114 seated in the correct position on follower wheel 117. It will be understood that wheel 117 may be driven by a motor instead of being driven by the motion of bandsaw blade 114.

Tensioning assembly 115 is configured to move relative to towers 82-88 when bandsaw assembly 10 is moved between the operational position and the transportation/storage position. FIG. 4 shows the position of follower wheel 117 when bandsaw assembly 10 is in the transportation/storage position. It can be seen that pin 119 is located a distance "L1" longitudinally from the centers of drive wheels 112 and that first and second arms 125, 127 are positioned at an angle "α1" relative to first end beam 18. FIG. 8 shows that the position of follower wheel 117 when bandsaw assembly 10 is in the operational position and at a maximum width "W2". In this instance, follower wheel 117 is located a distance "L2" from the centers of the drive wheels 112 and at an angle "α2" relative to first end beam 18.

Bandsaw blade 114 may be between 40 feet and 60 feet in length and about 3 inches wide. Blade 114 is passed around drive wheels 112 and the tensioning assembly's follower wheel 117 and is engaged by blade guides 113 to seat blade 114 correctly on wheels 112, 117. Motors 108 may be controlled by the control panel and a CPU in the control panel synchronizes the four motors 108, ensuring that they rotate at the same time and at the same speed. This ensures that blade 114 will be driven smoothly. Motors 108 may be hydraulic, pneumatic or electrically driven motors. The tensioning assembly 115 ensures that the tension on blade 114 is maintained whether bandsaw assembly 10 is in the transportation/storage position or in the operational position or anywhere therebetween.

A support bar 116 (FIG. 1) may extend between tower 82 and tower 84 and another support bar 118 (FIG. 3) may extend between tower 86 and tower 88. Support bars 116, 118 provide stability to towers 82-88 and help ensure that all movements of the towers which are engaged with each other through bars 116, 118 occur in synchrony. Bars 116, 118 may be connected at any appropriate locations on towers 82/84 and 86/88, such as at the top (as illustrated) or part of the way down the first tubular members thereof. Bars 116, 118 are located so as not to interfere with wheels 112 or blade 114. Additional bars may connect towers 82 and 88; and towers 84 and 88. The connection between towers 84-88 and bars 116, 118 and any additional bars may be permanent. Alternatively, any or all of the bars 116, 118 and any additional bars may be set up so that they may be selectively disengaged from the respective towers 82-88. This would be done if workpiece 24 is substantially longer or of a greater diameter and bandsaw assembly 10 has to be rotated to bring a different region of blade 114 (other than the region between towers 84 and 86) into contact with workpiece 24, as will be later described herein. It will further be understood that support bars 116, 118 may be completely omitted from bandsaw assembly 10 if towers 82-88 are of sufficient strength to be self supporting and do not require additional bracing.

Figure 9A:
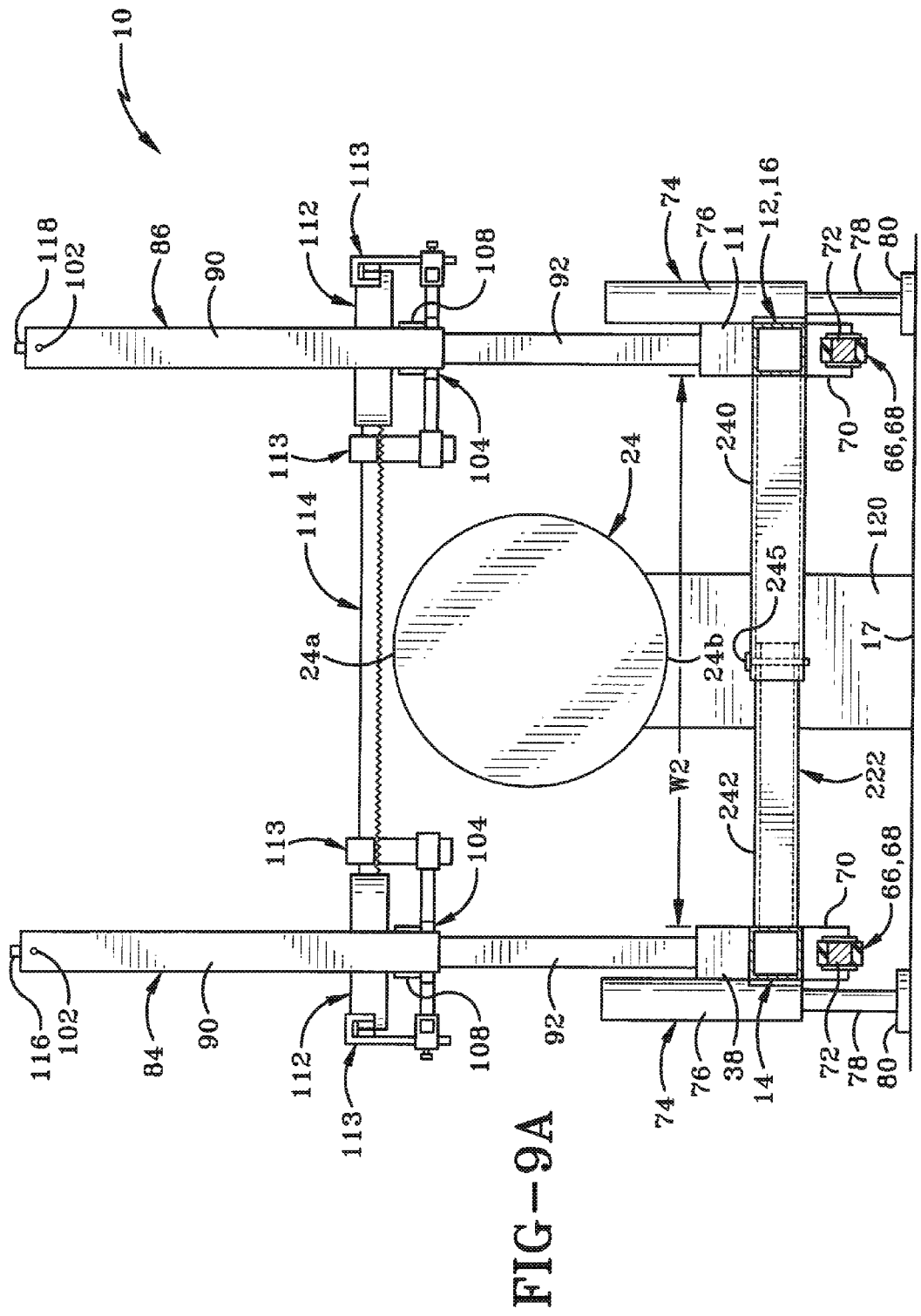
FIG. 9A is a first end view of the bandsaw assembly taken along line 9-9 of FIG. 8 with components of the tensioner assembly omitted and showing an alternate embodiment of a crossbeam extending between the first and second side beams.

FIG. 9A shows an alternative embodiment of a frame 12 where crossbeam 22 is illustrated as being free of any activation mechanism. In this instance, crossbeam 22 comprises a first tubular member 240 and a second tubular member 242 which telescope relative to each other and are locked in place relative to each other by a pin 245 which passes through aligned holes (not numbered) in first and second tubular members 240, 242. It will be understood that additional similarly configured crossbeams (with or without hydraulic or pneumatic cylinders) may be used on assembly 10.

Figure 11:
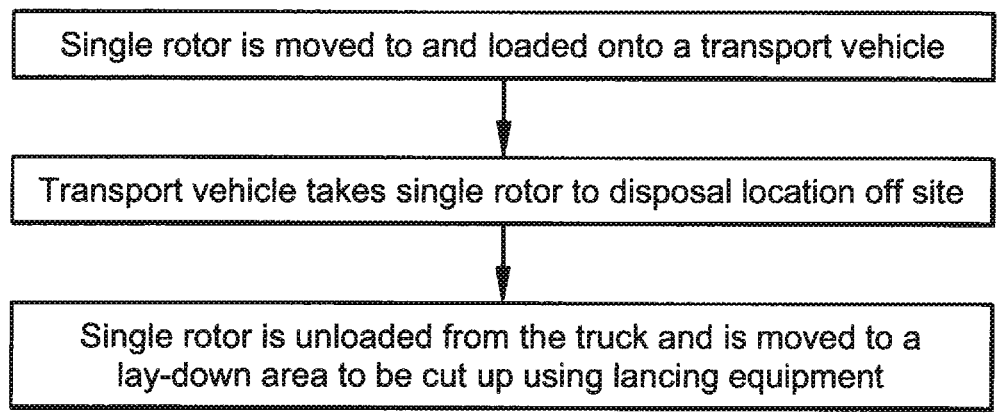
FIG. 11 is a flowchart showing a prior art methodology of cutting large diameter cylindrical members at a disposal location.
Figure 12:
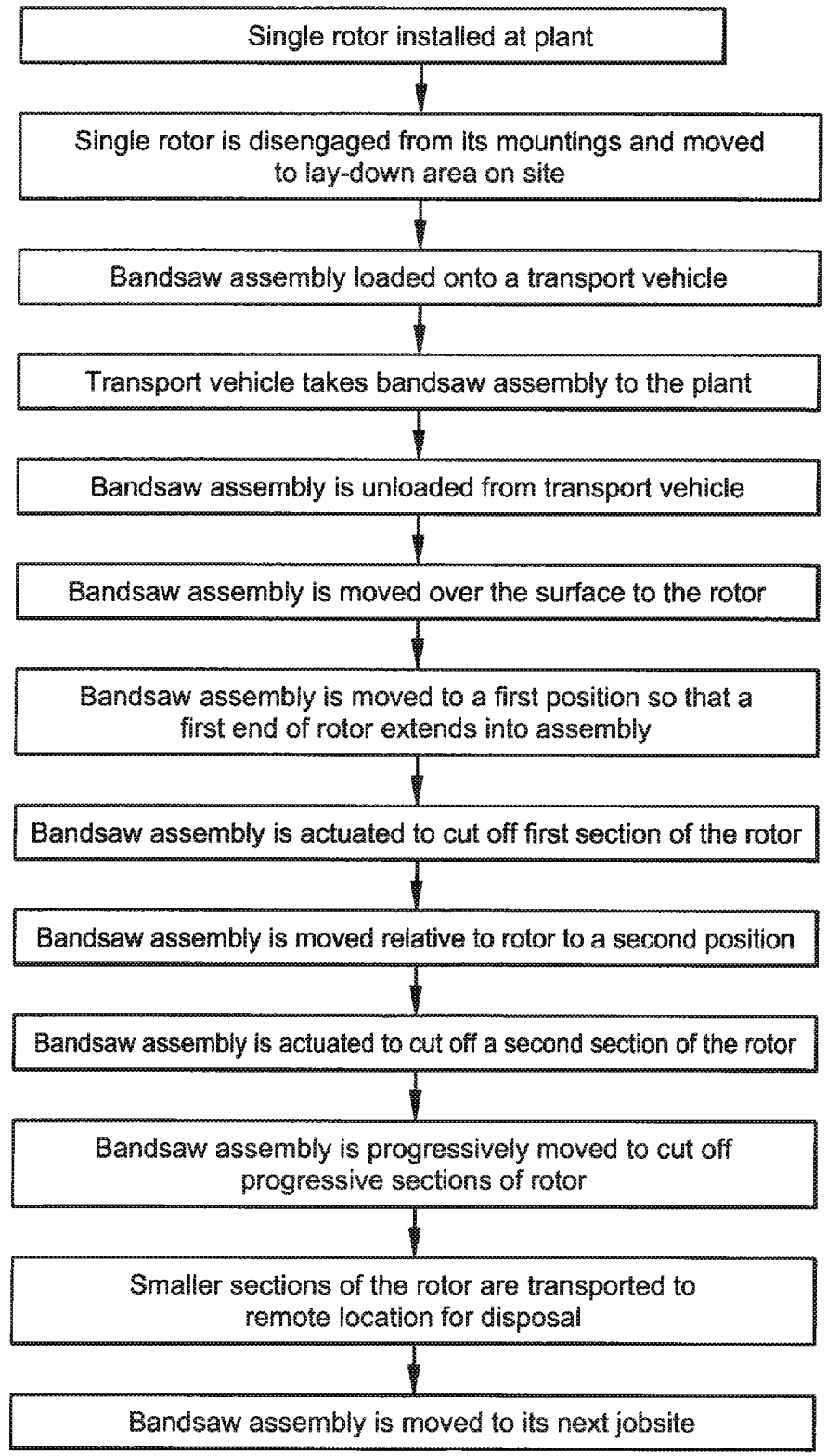
FIG. 12 is a flowchart showing a methodology for cutting large diameter cylindrical members in accordance with an aspect of the present invention.

Referring to FIGS. 11 and 12 there is shown a prior art methodology for cutting large diameter, heavy cylindrical objects (FIG. 11) and a new methodology for cutting such large diameter, heavy cylindrical objects in accordance with an aspect of the present invention.

In previously known systems, illustrated in FIG. 11, a rotor to be disposed of would be disengaged from its mounting at the factory, plant or jobsite and be moved to a location on the site where it was loaded onto a transport vehicle; typically some type of heavy haul equipment. The transport vehicle would then take the single rotor to a disposal location that is off site. At the disposal location the single rotor would be unloaded from the truck and moved to a laydown area. In the laydown area the single rotor would then be cut into smaller sections using lancing equipment.

The present methodology, shown in FIG. 12, is in stark contrast to the prior known methodologies. In the present methodology, a rotor, drive shaft, or heat exchanger installed in the plant or factory is disengaged from its mountings and is moved to a laydown area on site. Because the workpiece 24 to be cut is a large and heavy rotor, drive shaft or heat exchanger, the bandsaw assembly 10 is loaded onto some type of transportation vehicle and is transported or moved to the power plant, factory or jobsite. The movement of bandsaw assembly 10 onto the trailer or into the truck may be aided by wheels 64 and track assembly 66 which enable bandsaw assembly to be more easily moved up and down ramps on the vehicle. When the transportation vehicle reaches the plant factory or jobsite, the bandsaw assembly 10 is unloaded from the vehicle and is then moved to the laydown location at the plant or factory across the surface 17 of the factory or jobsite by way of the wheels 64 and/or track assembly 66 on the assembly 10. The bandsaw assembly 10 is maneuvered across the surface 17 and into a position adjacent the cylindrical object and such that at least a portion of that cylindrical object (workpiece 24) extends into the space 15 defined by frame 12. The workpiece 24, i.e., rotor, heat exchanger or shaft will be lifted and moved into position by way of a gantry crane or any other type of system which can lift and manipulate the heavy workpiece 24 and some suitable type of temporary support stand 120 may be positioned beneath workpiece 24, as is shown in FIG. 9.

Once the bandsaw assembly 10 is correctly positioned relative to workpiece 24 at the laydown location, bandsaw assembly 10 is actuated and the cutting action is started, as will be described below, and a first smaller section is cut off the workpiece 24. The bandsaw assembly 10 is then moved longitudinally along a next portion of the length of the workpiece 24 and toward the opposite end thereof and so that a next section of the cylindrical object projects into the space 15 defined by the bandsaw assembly 10. The next section of the workpiece 24 is cut off. The bandsaw assembly 10 is then moved longitudinally once again toward the opposite end of the workpiece 24 and so that a next section of the cylindrical object projects into the space 15. That next section is again cut off. This progressive movement of the bandsaw assembly 10 and subsequent cutting of a section of the workpiece 24 is repeated until, eventually, the end of the workpiece is reached. The bandsaw assembly 10 is then moved across the surface 17 and is loaded back onto the transport vehicle and then transported to the next jobsite. The smaller cut sections of the rotor, drive shaft or heat exchanger are then moved without the use of heavy haul equipment to an off site disposal location to be disposed of or otherwise processed.

It will be understood that the bandsaw assembly 10 may be rotated at any point in the process into the orientation shown in FIG. 8A so that two simultaneous cuts may be made in the workpiece 24.

When the bandsaw assembly 10 is to be transported to or from the jobsite, plant or factory as described above, the bandsaw assembly 10 is first moved into the transportation/storage position shown in FIG. 4. In order to do this the operator will engage the control panel provided on assembly 10 or on a remote operatively engaged therewith and will thereby actuate the electric, hydraulic or pneumatic system. This system is actuated to bring first side beam 14 and second side beam 16 toward each other. Prior to the movement of beams 14, 16 the second end beam 20 is pivoted into the position where the beam 20 is disposed adjacent and parallel to the first and second side beams 14, 16. Movement of first and second side beams 14, 16 also moves tensioning assembly 115 from the position shown in FIG. 8 to the position shown in FIG. 4.

Figure 10:
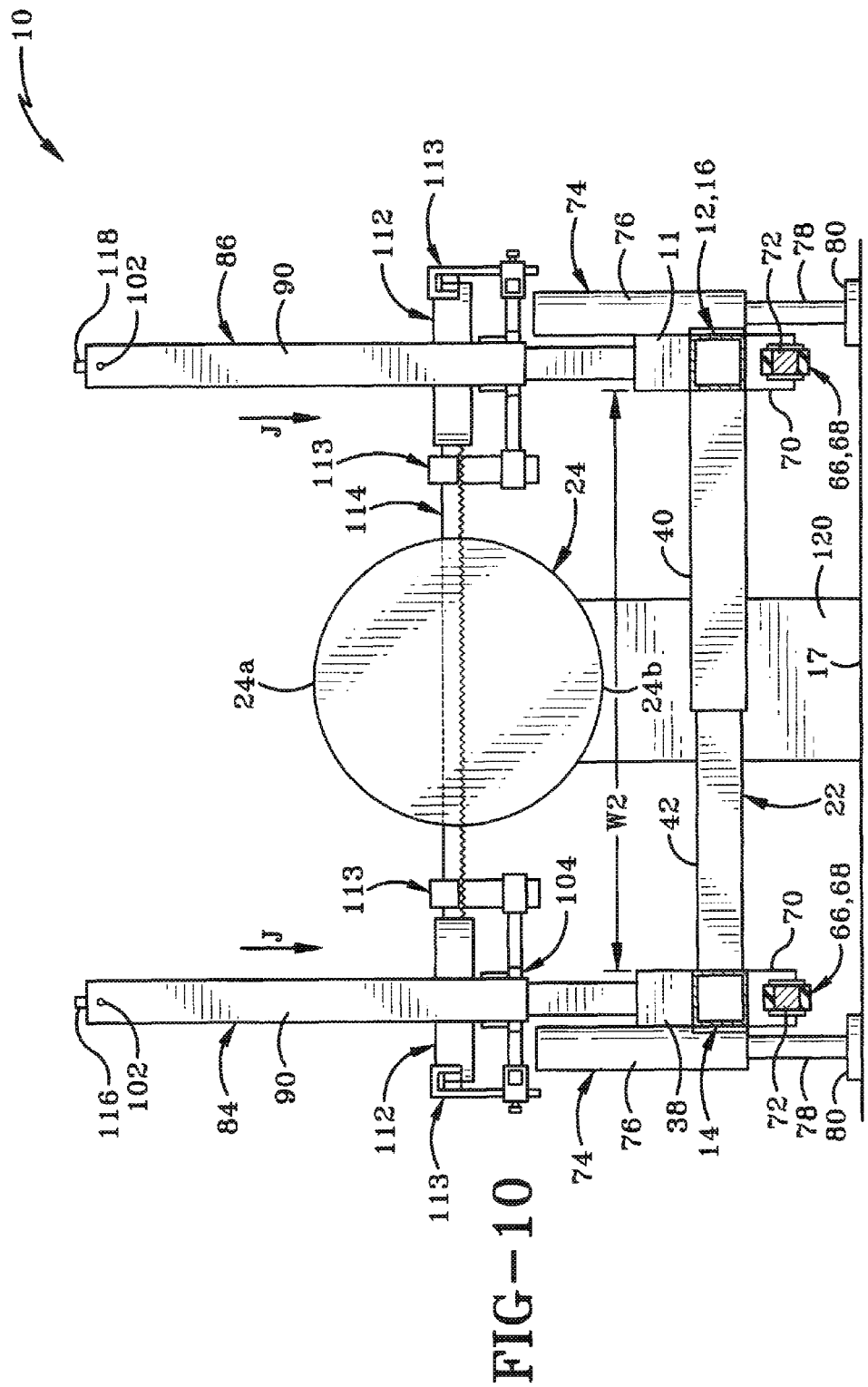
FIG. 10 is a first end view of the bandsaw assembly with the components of the tensioner assembly omitted and showing the towers in a partially retracted position and the bandsaw blade cutting through the workpiece.

As indicated above, when the trailer or truck reaches the power plant or factory, bandsaw assembly 10 is unloaded and is moved, via wheels and track assembly 66 across surface 17 to the location of the workpiece 24 (rotor, pipe, drive shaft etc.) to be cut. Depending on the position of workpiece 24 relative to surrounding machinery, walls, etc., the operator of bandsaw assembly 10 will determine the correct orientation for assembly 10. Typically, the assembly 10 is oriented so that a longitudinal axis of workpiece 24 will align with a longitudinal axis "Y" of bandsaw assembly 10. This first orientation is illustrated in FIGS. 8, 9 and 10.

When bandsaw assembly 10 is in the correct orientation the assembly 10 will be moved into the operational second position by moving first and second side beams 14, 16 apart so that space 15 is of the width "W2" (FIG. 8). In order to increase the width from width "W1" to "W2" the control panel is used to activate the hydraulic (electric or pneumatic system) which is operatively engaged with cylinder/piston 30, 32 in first end member 18. As has been previously described herein, when cylinder/piston 30, 32 is activated, piston 32 is cause to extend further outwardly from cylinder 30 and this causes first tubular member 26 to extend further outwardly from second tubular member 28 (or causes second tubular member 28 to slide out of bore 26a of first tubular member 28. Either way, the overall length of first end member 18 increases, thus increasing width "W1" to a width "W2". If crossbeam 22 includes a similar hydraulic system, that system will be simultaneously activated with that of first end beam 18. If crossbeam 22 lacks a hydraulic system, then when first end member 18 is extended in the aforementioned fashion, the first tubular member 40 of crossbeam 22 will also automatically be caused to slide relative to the second tubular member 42, thus extending its effective overall length. Thus, first and second side beams 14, 16 are moved to a position of a greatest distance from each other. As this occurs, the gap between tower 82 and tower 88 will increase to a size sufficient for the workpiece 24 to be received therethrough. Second end beam 20 is then pivoted from its position adjacent and parallel to one of side beams 14, 16 to a new position where the beam 20 is oriented generally at right angles to side beams 14, 16. Second end beam 20 is then locked into this orientation by engaging the appropriate pin 50 or 62.

Bandsaw assembly 10 is then moved across surface 17 and into position under and around workpiece 24 and such that workpiece 24 is introduced into bandsaw assembly 10 through a gap defined between towers 82 and 88 at the second end of assembly 10. Assembly 10 will be positioned such that workpiece 24 extends over the space 15 defined by first and second side beams 14, 16 and first and second end beams 18, 20. Since workpiece 24 is permanently secured at one end (i.e., the end not shown in FIG. 8), bandsaw assembly is maneuvered across surface 17 using wheels 64 and tracks to essentially "drive" assembly around and under workpiece 24.

As indicated previously, the width "W2" of bandsaw assembly 10 may be in the order of about twelve feet. If the rotor, heat exchanger or drive shaft is of a diameter which will fit comfortably in the gap between towers 82 and 88, bandsaw assembly 10 may be positioned differently. This is illustrated in FIG. 8A where it can be seen that bandsaw assembly 10 is oriented in such a manner that the larger diameter workpiece 224 extends through a gap defined by towers 86 and 88. (The assembly 10 may also be rotated so that workpiece 224 will extend through a gap defined between towers 82 and 84.) This orientation of bandsaw assembly 10 will also be used if there is insufficient room in the plant, factory or jobsite for the entire length "L" of bandsaw assembly 10 to extend longitudinally outwardly in front of a smaller diameter workpiece 24. It is possible to use bandsaw assembly 10 in this second orientation because blade 114 travels around all four drive wheels 112 and thus there is always a length of blade 114 disposed in the gap between adjacent towers 82-88 and this length of blade 114 may be used to cut workpiece 24 or 224 in one or two places, depending on how far into or across bandsaw assembly 10 the workpiece extends.

It is then necessary to level assembly and stabilize assembly 10 against possible movement during operation of blade 114. This is accomplished, as previously described herein, by lowering levelling jacks 74 until their feet 80 contact surface 17 and thereby lifting wheels 64 and track assembly 66 off surface 17.

Blade 114 is engaged around drive wheels 112 and follower wheel 117 if blade 114 has not been engaged therewith prior to moving assembly 10 to the jobsite or prior to leveling and stabilizing assembly 10. If workpiece 24 has been positioned over space 15 before engaging blade 114, then it may be necessary to move towers 80-88 into their extended positions, as been previously described herein, in order to provide sufficient clearance between blade 114 and upper surface 24a (FIG. 9) of workpiece 24. When bandsaw assembly 10 is positioned correctly relative to workpiece 24 (or 224), one or more support stands 120 (FIG. 9) may be positioned under the free end of workpiece 24, i.e., under at least a portion of workpiece 24 which extends over space 15.

Support stand 120 may be required so that the section of workpiece 24 or 224 which is subsequently cut off the rest of workpiece will not drop onto surface 17 (and potentially roll along surface 17) when it separates from the rest of workpiece 24. A dropping or rolling section of workpiece 24 could potentially injure the operator of assembly 10 and/or damage bandsaw assembly 10.

When everything is in the correct position and ready to go the operator will engage the control panel to activate motors 108 which drive wheels 112. As the blade 114 passes around wheels 112, as soon as wheels 112 rotate in response to rotation in drive shafts 110, blade 114 will rotate in unison with wheels 112. As previously described the rotating blade will also rotate follower wheel 117 of tensioning assembly 115. Motors 108 are activated to cause blade 114 to rotate in one or the other of a clockwise or counter-clockwise direction. For instance, referring to FIG. 8, blade 114 may be caused to rotate in the direction indicated by arrow "K". The hydraulic system is also activated via the control panel to cause towers 82-88 to start to retract and descend toward frame 12 in the direction of arrow "J" (FIG. 10) in order to bring the teeth of the rotating blade 114 into contact with workpiece 24, thereby cutting into the same. Since a cooling system may be provided on bandsaw assembly 10 (although not illustrated herein), nozzles will direct coolant or water toward the region where blade 114 is cutting into workpiece 24. Continued descent of towers 80-88 and rotation of blade 114 will cause blade 114 to cut a section of workpiece 24 off of the main body of the workpiece. When blade 114 clears lower surface 24*b* of workpiece 24, motors 108 are automatically cut and rotation of wheels 112, 117 and thereby of blade 114 ceases.

Towers 80-88 may be moved to their extended positions once again to allow workers to gain access to the cut-off section of workpiece 24 which will now be resting alone on support 120. Second end member 20 may be moved to an open position, as has been previously described, so that the workers can gain access to space 15 and to ensure there are no tripping hazards in the way of the workers as they remove the cut section of workpiece 24. If needed, jacks 74 may be moved to the retracted position so that wheels 64 and track assembly 68 once again contact surface 17 and then bandsaw assembly 10 may be moved across the surface and out of the way.

Bandsaw assembly 10 may then be moved across the surface 17 and toward the end of workpiece 24 and until the next section of workpiece 24 extends into an appropriate position within space 15 of bandsaw assembly 10 that will enable it to be cut using blade 114; and the cutting procedure described above will be used to cut this next section off the workpiece 24. These above described steps will be repeated until the majority of the workpiece 24 has been cut into sections. Those sections may then be more readily and easily removed from the plant or factory for subsequently disposal.

There may be instances when instead of blade 114 being generally horizontally disposed above workpiece 24 (as illustrated in FIG. 9), it may be advantageous to have blade 114 inclined at a slight angle. If this is desired then two of the towers, such as towers 86 and 88, may not be elevated to the same degree as towers 82 and 84. This will slightly incline the blade 114. The positions of towers 86, 88 relative to towers 82, 84 will have to be maintained during the cutting action. Control panel may include or be operatively linked to a CPU provided with programming to control bandsaw assembly 10 so that the machine is able to cut at precise angles. (The programming could also control the rotational speed of motors 108 and thereby the rotational speed of blade 114.)

When workpiece 24 has been completely cut into sections, bandsaw assembly 10 is moved across surface 17 and is then moved from the operational position (FIG. 8) back into the transportation/storage position (FIG. 4), i.e., the width of bandsaw assembly 10 is changed from "W2" back to "W1". Assembly 10 is moved across surface 17 within the plant, factory or at the jobsite and is loaded back onto a trailer or into a truck for transportation to the next jobsite.

Although first and second side beams 14, 16 have been disclosed herein as being of a substantially fixed length "L", it will be understood that the two beams 14, 16 may, instead, be adjustable in length. That adjustability may be provided in the manner as described with reference to first and second end beams 18, 20 or may be provided in any other suitable manner. If this is the case then bandsaw assembly 10 would be of an adjustable length to accommodate different lengths of workpieces.

Similarly, although first and second end beams 18, 20 have been disclosed herein as being of adjustable lengths so that the width of bandsaw assembly 10 may vary between width "W1" and width "W2", the first and second end beams 18, 20 may instead each be of a fixed length. If this is the case then bandsaw assembly would be of a fixed width.

It will of course be understood that all of the first and second side beams 14, 16 and first and second end beams 18, 20 may be adjustable in length or all of the first and second side beams 14, 16 and first and second end beams 18, 20 may be of fixed lengths.

It has been disclosed herein that bandsaw assembly 10 is movable between transportation/storage position and an operational position and that in the transportation/storage position the width of assembly 10 is "W1" and is at a minimum. It has furthermore been disclosed that in the operational position the width of assembly 10 is "W2" and is at a maximum. It may also be possible to selectively change the width to a size that is between width "W1" and width "W2" as desired. This change in width would be made so that bandsaw assembly 10 may be used to cut a variety of different diameter workpieces. Tensioner assembly 115 would ensure that the correct tension is applied to blade 114 irrespective of the selected width of assembly 14.

While it has been disclosed herein that the bandsaw assembly 10 is transported and stored when the assembly is in the position where the first and second side beams 14, 16 are at the minimum width "W1" from each other, it will further be understood bandsaw assembly 10 may be used to cut a workpiece even when assembly 10 is in the transportation/storage position. This is possible if a workpiece 24 is of a diameter that fits comfortably within the space 15 defined by first and second side beams 14, 16 and first and second end beams 18, 20 when assembly 10 is in the transportation/storage position. If the workpiece's diameter is too large for the space 15 when assembly 10 is in the transportation/storage position, then assembly 10 must be adjusted to increase the distance between first and second side beams 14, 16 i.e., the width must be increased from width "W1" and adjusted to closer to "W2". In other words, depending on the diameter of workpiece 24, bandsaw assembly 10 may be operated to cut sections from a workpiece 24 when assembly 10 is in either of the transportation/storage position or the operational position described earlier herein.

It will be understood that bandsaw assembly 10 may be utilized to cut components other than those specifically mentioned herein into sections. So, for example, large diameter pipes used in pipelines, factories and plants may be cut using the assembly 10.

It will further be understood that, in certain instances, instead of disengaging a large diameter cylindrical component from its mountings, bandsaw assembly 10 may be moved to a position at the jobsite where it could be used to cut a cylindrical component while that component is still in a mounted or partially mounted condition.

It will further be understood that while bandsaw assembly 10 has been described herein as being used to cut large diameter cylindrical components into smaller sections, assembly 10 may be used to cut stock of other cross-sectional configurations (such as square or rectangular), or may be used to cut components such as I-beams, or still further may be used to cut more conventional diameter components at a jobsite, plant or factory. Still further, while the assembly 10 has been described as being useful for cutting large diameter components when plants, factories or pipelines are being dismantled, assembly 10 may be transported to a jobsite, plant or factory and be used during the construction phase or a repair or retrofitting phase of the same.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the bandsaw assembly are an example and the invention is not limited to the exact details shown or described.

The invention claimed is:

1. A bandsaw assembly comprising:
    a horizontally-oriented frame that is rectangular in shape:
    ground-engaging wheels or a ground-engaging track provided on the frame; said wheels or track being adapted to rest upon a flat surface;
    four spaced apart towers extending vertically upwardly from the frame, wherein each tower is located proximate a different corner of the frame;
    four rotatable drive wheels, each of said four rotatable drive wheels being mounted on a different one of the four towers; each said four rotatable drive wheels being horizontally oriented and presenting a vertically oriented circumferential surface;
    and wherein each of said four rotatable drive wheels is separately positionable by the associated tower at an adjustable distance above the frame;
    an arm extending outwardly from a first one of the four towers toward a second one of the four towers:
    a fifth rotatable drive wheel mounted on the arm and being located proximate to a first two of the four drive wheels and remote from a third drive wheel and a fourth drive wheel of the four drive wheels; said fifth drive wheel being horizontally oriented and presenting a vertically oriented circumferential surface:
    a motor operatively engaged with one or more of said four rotatable drive wheels; and
    a bandsaw blade passing around all five of the rotatable drive wheels and being in contact with the circumferential surfaces thereof; said blade being driven by all five of the rotatable drive wheels; and
    wherein each of the four towers is variable in length and when the length of the four towers is varied, each of the four drive wheels is thereby moved further away from the frame or closer to the frame to separately change the adjustable distance above the frame for each of the first two of the four drive wheels, the third drive wheel, and the fourth drive wheel; and the movement of the four drive wheels thereby raises or lowers the bandsaw blade relative to the frame.

2. The bandsaw assembly as defined in claim 1, wherein the frame includes a first end member having a length that is selectively adjustable to adjust the frame to accommodate different diameter workpieces: and wherein the four towers are selectively moved toward each other or away from each other when the frame is adjusted to accommodate the different diameter workpieces.

3. The bandsaw assembly as defined in claim 2, wherein the frame includes a first side member, a second side member, and a second end member; and the first and second side members are oriented substantially parallel to each other and spaced apart from each other; and the first and second end members are oriented substantially parallel to each other and spaced apart from each other; and the plurality of towers extend upwardly from the first and second side members and the first and second end members.

4. The bandsaw assembly as defined in claim 3, wherein a width of the bandsaw assembly as measured from the first side member to the second side member is selectively variable adjustable by adjusting the length of the first end member to move the bandsaw assembly between a first position where the assembly is transportable and a second position where the assembly is used to cut a workpiece.

5. The bandsaw assembly as defined in claim 2, further including an actuating mechanism for selectively varying adjusting the length of the first end member.

6. The bandsaw assembly as defined in claim 5, wherein the actuating mechanism is a hydraulic or pneumatic cylinder and piston.

7. The bandsaw assembly as defined in claim 2, wherein one of the first and second end members is pivotally attached at a first end to one of the first and second side members; and the pivotally attached one of the first and second end members is rotatable between an open position and closed position relative to the one of the first and second side members.

8. The bandsaw assembly as defined in claim 7, further comprising a latching mechanism locking member for selectively latching locking a second end of the one of the pivotable pivotally attached first and second end members to the other of the first and second side members.

9. The bandsaw assembly as defined in claim 1, wherein the arm is pivotally mounted, and wherein the fifth wheel is moveable toward and away from the first two of the four drive wheels that are positioned adjacent thereto.

* * * * *